US010572390B2

(12) United States Patent
Petkov et al.

(10) Patent No.: US 10,572,390 B2
(45) Date of Patent: Feb. 25, 2020

(54) METHODS AND APPARATUS FOR LOADING FIRMWARE ON DEMAND

(71) Applicant: Apple Inc., Cupertino, CA (US)

(72) Inventors: Vladislav Petkov, Cupertino, CA (US); Haining Zhang, Cupertino, CA (US); Karan Sanghi, Cupertino, CA (US); Saurabh Garg, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 62 days.

(21) Appl. No.: 15/273,413

(22) Filed: Sep. 22, 2016

(65) Prior Publication Data
US 2017/0249164 A1  Aug. 31, 2017

Related U.S. Application Data

(60) Provisional application No. 62/301,487, filed on Feb. 29, 2016.

(51) Int. Cl.
*G06F 9/44* (2018.01)
*G06F 12/1009* (2016.01)
(Continued)

(52) U.S. Cl.
CPC ............ *G06F 12/1009* (2013.01); *G06F 1/24* (2013.01); *G06F 3/0626* (2013.01);
(Continued)

(58) Field of Classification Search
CPC ...... G06F 12/1009; G06F 1/24; G06F 3/0626; G06F 3/0637; G06F 3/0665;
(Continued)

(56) References Cited

U.S. PATENT DOCUMENTS

| 4,805,137 A | 2/1989 | Grant et al. |
| 4,949,299 A | 8/1990 | Pickett et al. |

(Continued)

FOREIGN PATENT DOCUMENTS

| EP | 3013008 A1 | 4/2016 |
| JP | H02306082 A | 12/1990 |

(Continued)

OTHER PUBLICATIONS

Achanta R., et al., "Slic Superpixels Compared to State-of-The-Art Superpixel Methods," IEEE Transactions on Pattern Analysis and Machine Intelligence, 2012, vol. 34 (11), pp. 2274-2282.

(Continued)

*Primary Examiner* — Ramon A. Mercado
(74) *Attorney, Agent, or Firm* — Gazdzinski & Associates, PC

(57) ABSTRACT

Methods and apparatus for enabling a peripheral processor to retrieve and load firmware for execution within the constraints of its memory. The peripheral processor is allocated a portion of the host processor's memory, to function as a logical secondary and tertiary memory for memory cache operation. The described embodiments enable the peripheral processor to support much larger and more complex firmware. Additionally, a multi-facetted locking mechanism is described which enables the peripheral processor and the host processor to access the secondary memory, while minimally impacting the other processor.

21 Claims, 28 Drawing Sheets

(51) Int. Cl.
  *G06F 8/61* (2018.01)
  *G06F 13/42* (2006.01)
  *G06F 1/24* (2006.01)
  *G06F 12/14* (2006.01)
  *G06F 3/06* (2006.01)

(52) U.S. Cl.
  CPC .......... *G06F 3/0637* (2013.01); *G06F 3/0665* (2013.01); *G06F 3/0683* (2013.01); *G06F 8/63* (2013.01); *G06F 12/1441* (2013.01); *G06F 13/4282* (2013.01); *G06F 2212/1008* (2013.01); *G06F 2212/1052* (2013.01); *G06F 2212/1056* (2013.01); *G06F 2212/621* (2013.01); *G06F 2213/0026* (2013.01)

(58) Field of Classification Search
  CPC ...... G06F 3/0683; G06F 8/63; G06F 13/4282; G06F 2212/1008; G06F 2212/1052; G06F 2212/1056; G06F 2212/621; G06F 2213/0026
  See application file for complete search history.

(56) References Cited

U.S. PATENT DOCUMENTS

| | | | |
|---|---|---|---|
| 4,987,529 A * | 1/1991 | Craft | G06F 13/364 710/113 |
| 5,367,688 A | 11/1994 | Croll | |
| 5,467,459 A | 11/1995 | Alexander et al. | |
| 5,485,578 A | 1/1996 | Sweazey | |
| 5,613,086 A | 3/1997 | Frey et al. | |
| 5,659,542 A | 8/1997 | Bell et al. | |
| 5,708,779 A | 1/1998 | Graziano et al. | |
| 5,731,973 A * | 3/1998 | Takaishi | G06F 11/3034 360/78.09 |
| 5,850,395 A | 12/1998 | Hauser et al. | |
| 5,903,564 A | 5/1999 | Ganmukhi et al. | |
| 5,943,507 A | 8/1999 | Cornish et al. | |
| 6,008,992 A | 12/1999 | Kawakami | |
| 6,216,178 B1 | 4/2001 | Stracovsky et al. | |
| 6,233,702 B1 | 5/2001 | Horst et al. | |
| 6,260,152 B1 | 7/2001 | Cole et al. | |
| 6,359,863 B1 | 3/2002 | Varma et al. | |
| 6,411,997 B1 | 6/2002 | Dawes et al. | |
| 6,434,633 B1 | 8/2002 | Braun et al. | |
| 6,485,081 B1 | 11/2002 | Bingle et al. | |
| 6,523,073 B1 | 2/2003 | Kammer et al. | |
| 6,553,446 B1 | 4/2003 | Miller | |
| 6,693,895 B1 | 2/2004 | Crummey et al. | |
| 6,735,642 B2 | 5/2004 | Kagan et al. | |
| 6,815,873 B2 | 11/2004 | Johnson et al. | |
| 6,840,257 B2 | 1/2005 | Dario et al. | |
| 6,843,465 B1 | 1/2005 | Scott | |
| 6,947,442 B1 | 9/2005 | Sato et al. | |
| 6,948,094 B2 | 9/2005 | Schultz et al. | |
| 6,973,701 B2 | 12/2005 | Momoda et al. | |
| 6,990,594 B2 | 1/2006 | Kim et al. | |
| 7,013,536 B2 | 3/2006 | Golden et al. | |
| 7,032,282 B2 | 4/2006 | Powell et al. | |
| 7,055,793 B2 | 6/2006 | Biehl et al. | |
| 7,100,020 B1 | 8/2006 | Brightman et al. | |
| 7,127,600 B2 | 10/2006 | Zimmer et al. | |
| 7,191,240 B1 | 3/2007 | Johnson | |
| 7,281,172 B2 | 10/2007 | Chujo | |
| 7,347,221 B2 | 3/2008 | Berger et al. | |
| 7,397,774 B1 | 7/2008 | Holland et al. | |
| 7,398,382 B2 | 7/2008 | Rothman et al. | |
| 7,506,084 B2 | 3/2009 | Moerti et al. | |
| 7,509,391 B1 | 3/2009 | Chauvel et al. | |
| 7,587,575 B2 | 9/2009 | Moertl et al. | |
| 7,590,817 B2 | 9/2009 | Moertl et al. | |
| 7,617,377 B2 | 11/2009 | Moertl et al. | |
| 7,650,914 B2 | 1/2010 | Bogursky et al. | |
| 7,681,012 B2 * | 3/2010 | Verma | G06F 12/10 711/207 |
| 7,685,476 B2 | 3/2010 | Andre et al. | |
| 7,802,256 B2 | 9/2010 | Havens et al. | |
| 7,853,731 B1 | 12/2010 | Zeng | |
| 7,899,941 B2 | 3/2011 | Hendry et al. | |
| 7,908,335 B1 | 3/2011 | Citterelle et al. | |
| 7,926,520 B2 | 4/2011 | Bogursky et al. | |
| 7,941,682 B2 | 5/2011 | Adams | |
| 8,113,243 B2 | 2/2012 | Bogursky et al. | |
| 8,230,248 B2 | 7/2012 | Dance | |
| 8,255,725 B2 | 8/2012 | Shimazaki et al. | |
| 8,352,624 B2 | 1/2013 | Zimmerman et al. | |
| 8,422,404 B2 | 4/2013 | Taki | |
| 8,468,285 B2 | 6/2013 | Kobayashi | |
| 8,540,206 B2 | 9/2013 | Foshansky et al. | |
| 8,555,099 B2 | 10/2013 | Marinkovic et al. | |
| 8,606,073 B2 | 12/2013 | Woodman | |
| 8,635,412 B1 | 1/2014 | Wilshire | |
| 8,656,228 B2 | 2/2014 | Check et al. | |
| 8,769,168 B2 | 7/2014 | Moertl et al. | |
| 8,788,822 B1 | 7/2014 | Riddle | |
| 8,799,537 B1 | 8/2014 | Zhu et al. | |
| 8,808,091 B2 | 8/2014 | Shaw et al. | |
| 8,819,386 B1 | 8/2014 | Mather | |
| 8,832,331 B2 | 9/2014 | Co | |
| 8,848,809 B2 | 9/2014 | Whitby-Strevens | |
| 8,851,443 B2 | 10/2014 | Foshansky | |
| 8,876,062 B1 | 11/2014 | Baghdasarian | |
| 8,914,649 B2 | 12/2014 | So et al. | |
| 8,939,180 B2 | 1/2015 | Bogursky et al. | |
| 8,946,934 B2 | 2/2015 | Butts et al. | |
| 9,027,903 B2 | 5/2015 | Arekar et al. | |
| 9,152,580 B1 | 10/2015 | Chau et al. | |
| 9,170,957 B2 | 10/2015 | Touzni et al. | |
| 9,171,577 B1 | 10/2015 | Newman et al. | |
| 9,280,360 B2 | 3/2016 | Xu et al. | |
| 9,319,090 B2 | 4/2016 | Whitby-Strevens | |
| 9,544,069 B2 | 1/2017 | Whitby-Strevens et al. | |
| 9,547,535 B1 | 1/2017 | Wilt | |
| 9,568,970 B1 | 2/2017 | Kaushal et al. | |
| 9,582,448 B2 | 2/2017 | Saitou | |
| 9,594,718 B2 | 3/2017 | Kaushik et al. | |
| 9,769,756 B1 | 9/2017 | Cui et al. | |
| 9,830,289 B2 | 11/2017 | Pulyala et al. | |
| 9,910,475 B2 | 3/2018 | Kurts et al. | |
| 9,913,305 B2 | 3/2018 | Pinheiro et al. | |
| 9,932,757 B2 | 4/2018 | Hager et al. | |
| 9,959,124 B1 | 5/2018 | Herbeck et al. | |
| 1,007,836 A1 | 9/2018 | Sanghi; Karan et al. | |
| 2002/0013868 A1 | 1/2002 | West | |
| 2002/0044553 A1 | 4/2002 | Chakravorty | |
| 2002/0065867 A1 | 5/2002 | Chauvel | |
| 2002/0169938 A1 | 11/2002 | Scott et al. | |
| 2002/0195177 A1 | 12/2002 | Hinkley et al. | |
| 2003/0007567 A1 | 1/2003 | Newman et al. | |
| 2003/0014607 A1 | 1/2003 | Slavin et al. | |
| 2003/0086122 A1 | 5/2003 | Parry | |
| 2003/0200413 A1 | 10/2003 | Gurumoorthy et al. | |
| 2004/0044929 A1 | 3/2004 | Chujo | |
| 2004/0064589 A1 | 4/2004 | Boucher et al. | |
| 2004/0128568 A1* | 7/2004 | O'Shea | G06F 9/4418 713/300 |
| 2004/0179546 A1 | 9/2004 | McDaniel et al. | |
| 2004/0201749 A1 | 10/2004 | Malloy | |
| 2004/0221056 A1 | 11/2004 | Kobayashi | |
| 2004/0228365 A1 | 11/2004 | Kobayashi | |
| 2005/0005980 A1 | 1/2005 | Eberhardt et al. | |
| 2005/0076196 A1* | 4/2005 | Zimmer | G06F 9/4411 713/1 |
| 2005/0108385 A1 | 5/2005 | Wechter et al. | |
| 2005/0114620 A1* | 5/2005 | Justen | G06F 12/0802 711/170 |
| 2005/0117601 A1 | 6/2005 | Anderson et al. | |
| 2005/0149711 A1* | 7/2005 | Zimmer | G06F 9/4812 712/244 |
| 2005/0157781 A1 | 7/2005 | Ho et al. | |
| 2005/0198777 A1 | 9/2005 | Mabe | |
| 2005/0285862 A1 | 12/2005 | Noda et al. | |
| 2006/0039285 A1 | 2/2006 | Chapman et al. | |
| 2006/0047989 A1 | 3/2006 | Delgado et al. | |

(56) References Cited

U.S. PATENT DOCUMENTS

| | | |
|---|---|---|
| 2006/0107071 A1 | 5/2006 | Girish et al. |
| 2006/0186700 A1 | 8/2006 | Browne et al. |
| 2006/0186706 A1 | 8/2006 | Browne et al. |
| 2006/0218301 A1 | 9/2006 | O'Toole et al. |
| 2006/0232051 A1 | 10/2006 | Morris et al. |
| 2007/0005869 A1 | 1/2007 | Balraj et al. |
| 2007/0043901 A1* | 2/2007 | Wu ................... G11B 19/02 711/111 |
| 2007/0063540 A1 | 3/2007 | Browne et al. |
| 2007/0063541 A1 | 3/2007 | Browne et al. |
| 2007/0070997 A1 | 3/2007 | Weitz et al. |
| 2007/0080013 A1 | 4/2007 | Melz et al. |
| 2007/0118831 A1 | 5/2007 | Kondo |
| 2007/0180041 A1 | 8/2007 | Suzuoki |
| 2007/0201492 A1 | 8/2007 | Kobayashi |
| 2007/0226417 A1 | 9/2007 | Davis |
| 2007/0261307 A1 | 11/2007 | Alexander et al. |
| 2007/0286246 A1 | 12/2007 | Kobayashi |
| 2008/0007081 A1 | 1/2008 | Shibata et al. |
| 2008/0010563 A1 | 1/2008 | Nishimura |
| 2008/0046689 A1* | 2/2008 | Chen ................... G06F 9/3012 712/24 |
| 2008/0077816 A1 | 3/2008 | Ravichandran |
| 2008/0100079 A1 | 5/2008 | Herrera et al. |
| 2008/0100092 A1 | 5/2008 | Gao et al. |
| 2008/0120911 A1 | 5/2008 | Browne et al. |
| 2008/0183931 A1 | 7/2008 | Verm et al. |
| 2008/0231711 A1 | 9/2008 | Glen et al. |
| 2008/0235355 A1 | 9/2008 | Spanier et al. |
| 2008/0244259 A1* | 10/2008 | Zimmer ................ G06F 9/4403 713/100 |
| 2008/0301148 A1 | 12/2008 | Lee et al. |
| 2009/0024924 A1 | 1/2009 | Kim |
| 2009/0113141 A1 | 4/2009 | Bullman et al. |
| 2009/0138650 A1* | 5/2009 | Lin ...................... G06F 8/65 711/103 |
| 2009/0177847 A1 | 7/2009 | Ceze et al. |
| 2009/0189442 A1 | 7/2009 | Chi |
| 2009/0225818 A1 | 9/2009 | Dapper et al. |
| 2009/0282050 A1 | 11/2009 | Thomas et al. |
| 2009/0282088 A1 | 11/2009 | Thomas et al. |
| 2009/0322531 A1 | 12/2009 | Estevez et al. |
| 2010/0017655 A1 | 1/2010 | Gooding et al. |
| 2010/0030932 A1 | 2/2010 | Ergas et al. |
| 2010/0082859 A1 | 4/2010 | Hendry et al. |
| 2010/0098419 A1 | 4/2010 | Levy et al. |
| 2010/0329319 A1 | 12/2010 | Dai et al. |
| 2011/0022859 A1 | 1/2011 | More et al. |
| 2011/0029696 A1 | 2/2011 | Uehara |
| 2011/0035575 A1 | 2/2011 | Kwon |
| 2011/0052142 A1 | 3/2011 | Sultenfuss et al. |
| 2011/0083002 A1 | 4/2011 | Albers et al. |
| 2011/0219208 A1 | 9/2011 | Asaad et al. |
| 2011/0242425 A1 | 10/2011 | Zeng |
| 2011/0248865 A1 | 10/2011 | Hong et al. |
| 2011/0257983 A1 | 10/2011 | Rathonyi et al. |
| 2011/0276710 A1 | 11/2011 | Mighani et al. |
| 2011/0283031 A1 | 11/2011 | Lee |
| 2011/0310296 A1 | 12/2011 | Lee et al. |
| 2011/0320861 A1 | 12/2011 | Bayer et al. |
| 2012/0017063 A1* | 1/2012 | Hummel ............. G06F 12/1081 711/200 |
| 2012/0072658 A1* | 3/2012 | Hashimoto .......... G06F 9/4418 711/104 |
| 2012/0084483 A1 | 4/2012 | Sanjive |
| 2012/0084484 A1 | 4/2012 | Post et al. |
| 2012/0102307 A1* | 4/2012 | Wong ................... G06F 21/10 713/2 |
| 2012/0124252 A1 | 5/2012 | Kayama et al. |
| 2012/0151913 A1 | 6/2012 | Foshansky |
| 2012/0159513 A1 | 6/2012 | Pakhunov et al. |
| 2012/0224640 A1 | 9/2012 | Sole et al. |
| 2012/0229076 A1 | 9/2012 | Zhu et al. |
| 2012/0306553 A1 | 12/2012 | Kim et al. |
| 2013/0050216 A1 | 2/2013 | Whitby-Strevens et al. |
| 2013/0057567 A1 | 3/2013 | Frank et al. |
| 2013/0091772 A1 | 4/2013 | Berger et al. |
| 2013/0111896 A1 | 5/2013 | Foshansky et al. |
| 2013/0124895 A1 | 5/2013 | Saha et al. |
| 2013/0138840 A1* | 5/2013 | Kegel .................. G06F 13/28 710/22 |
| 2013/0162911 A1 | 6/2013 | Glen |
| 2013/0290947 A1 | 10/2013 | Li |
| 2014/0033220 A1 | 1/2014 | Campbell et al. |
| 2014/0052976 A1 | 2/2014 | Marino et al. |
| 2014/0101468 A1 | 4/2014 | Narayanan et al. |
| 2014/0122828 A1* | 5/2014 | Kagan ................ G06F 12/1081 711/206 |
| 2014/0173236 A1 | 6/2014 | Kegel |
| 2014/0189057 A1 | 7/2014 | Sankoda et al. |
| 2014/0189392 A1 | 7/2014 | Bodio et al. |
| 2014/0211894 A1 | 7/2014 | Yang et al. |
| 2014/0215236 A1 | 7/2014 | Heinrich et al. |
| 2014/0244866 A1 | 8/2014 | Manula et al. |
| 2014/0247983 A1 | 9/2014 | MacInnis et al. |
| 2015/0036051 A1 | 2/2015 | Broberg et al. |
| 2015/0189109 A1 | 7/2015 | Whitby-Strevens et al. |
| 2015/0205749 A1 | 7/2015 | Whitby-Strevens et al. |
| 2015/0212806 A1 | 7/2015 | Hsieh |
| 2015/0267690 A1 | 9/2015 | Foshansky et al. |
| 2015/0271265 A1 | 9/2015 | Kobayashi et al. |
| 2015/0293873 A1 | 10/2015 | Shao et al. |
| 2015/0293875 A1 | 10/2015 | Sala et al. |
| 2015/0309650 A1 | 10/2015 | Ahmed et al. |
| 2015/0309940 A1* | 10/2015 | Kumar ................ G06F 12/1009 345/506 |
| 2015/0378737 A1 | 12/2015 | Debbage et al. |
| 2016/0034195 A1* | 2/2016 | Li ....................... G06F 13/382 711/117 |
| 2016/0041852 A1 | 2/2016 | Suarez et al. |
| 2016/0077989 A1 | 3/2016 | Pulyala et al. |
| 2016/0091959 A1 | 3/2016 | Barak et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0142988 A1 | 5/2016 | Powell et al. |
| 2016/0179157 A1 | 6/2016 | Ardanaz et al. |
| 2016/0208539 A1 | 7/2016 | Hofmann et al. |
| 2016/0224097 A1 | 8/2016 | Hirouchi |
| 2016/0224442 A1 | 8/2016 | Sanghi et al. |
| 2016/0239340 A1 | 8/2016 | Chauvet et al. |
| 2016/0269991 A1 | 9/2016 | Van et al. |
| 2016/0274338 A1 | 9/2016 | Davies et al. |
| 2016/0299860 A1 | 10/2016 | Harriman |
| 2016/0363955 A1 | 12/2016 | Stevens et al. |
| 2016/0364350 A1 | 12/2016 | Sanghi et al. |
| 2017/0026975 A1 | 1/2017 | Maric et al. |
| 2017/0089641 A1 | 3/2017 | Humfeld et al. |
| 2017/0108912 A1 | 4/2017 | Li et al. |
| 2017/0177222 A1 | 6/2017 | Singh et al. |
| 2017/0228481 A1 | 8/2017 | Pusuluri et al. |
| 2017/0249098 A1 | 8/2017 | Petkov et al. |
| 2017/0269675 A1 | 9/2017 | Klacar et al. |
| 2017/0286300 A1 | 10/2017 | Doshi et al. |
| 2017/0286322 A1 | 10/2017 | Garg et al. |
| 2017/0286323 A1 | 10/2017 | Garg et al. |
| 2018/0074572 A1 | 3/2018 | Bauman et al. |
| 2018/0101498 A1 | 4/2018 | Cosby et al. |
| 2018/0129261 A1 | 5/2018 | Garg et al. |
| 2018/0129269 A1 | 5/2018 | Garg et al. |
| 2018/0129270 A1 | 5/2018 | Garg et al. |
| 2018/0160155 A1 | 6/2018 | Iguchi et al. |
| 2018/0162770 A1 | 6/2018 | Hawtof et al. |
| 2018/0225251 A1 | 8/2018 | Sthoeger et al. |
| 2018/0367460 A1 | 12/2018 | Gao et al. |
| 2019/0042525 A1 | 2/2019 | McElrath et al. |
| 2019/0073011 A1 | 3/2019 | Paterson et al. |

FOREIGN PATENT DOCUMENTS

| | | |
|---|---|---|
| JP | H03169996 A | 7/1991 |
| JP | 2004086792 A | 3/2004 |

(56) References Cited

FOREIGN PATENT DOCUMENTS

| JP | 2012108677 A | 6/2012 |
|---|---|---|
| JP | 2013246642 A | 12/2013 |
| JP | 2015001867 A | 1/2015 |
| WO | WO-2008070138 A2 | 6/2008 |

OTHER PUBLICATIONS

Allène C., et al., "Seamless Image-based Texture Atlases Using Multi-band Blending," Pattern Recognition, 2008. ICPR 2008. 19th International Conference on, 2008.
Badrinarayanan V., et al., "Segnet: a Deep Convolutional Encoder-Decoder Architecture for Image Segmentation," arXiv preprint arXiv:1511.00561, 2015.
Barghout L. and Sheynin J., "Real-world scene perception and perceptual organization: Lessons from Computer Vision". Journal of Vision, 2013, vol. 13 (9).
Barghout L., "Visual Taxometric approach Image Segmentation using Fuzzy-Spatial Taxon Cut Yields Contextually Relevant Regions," Communications in Computer and Information Science (CCIS), Springer-Verlag, 2014, pp. 163-173.
Bay H., et al., "Surf: Speeded up Robust Features," European Conference on Computer Vision, Springer Berlin Heidelberg, 2006, pp. 404-417.
Beier et al., "Feature-Based Image Metamorphosis," in Computer Graphics Journal, Jul. 1992, vol. 26 (2), pp. 35-42.
Brainard R.C., et al., "Low-Resolution TV: Subjective Effects of Frame Repetition and Picture Replenishment," Bell Labs Technical Journal, Jan. 1967, vol. 46 (1), pp. 261-271.
Burt et al., "A Multiresolution Spline with Application to Image Mosaics," in ACM Transactions on Graphics (TOG), 1983, vol. 2, No. 4, pp. 217-236.
Chan T.F. and Vese LA., "Active contours without edges". IEEE Transactions on Image Processing, 2001, 10 (2), pp. 266-277 (hereinafter "Chan").
Chang H., et al., "Super-resolution Through Neighbor Embedding," Computer Vision and Pattern Recognition, 2004. CVPR 2004. Proceedings of the 2004 IEEE Computer Society Conference on, vol. 1, 2004.
Elen R., "Whatever happened to Ambisonics" AudioMedia Magazine, Nov. 1991.
Gracias N., et al., "Fast Image Blending Using Watersheds and Graph Cuts," Image and Vision Computing, 2009, vol. 27 (5), pp. 597-607.
Herbst E., et al., "Occlusion Reasoning for Temporal Interpolation Using Optical Flow," Department of Computer Science and Engineering, University of Washington, Tech. Rep. UW-CSE-09-08-01, 2009.
Jakubowski M., et al., "Block-based motion estimation algorithms—a survey," Opto-Electronics Review 21, No. 1 (2013), pp. 86-102.
Kendall A., et al., "Bayesian Segnet: Model Uncertainty in Deep Convolutional Encoder-Decoder Architectures for Scene Understanding," arXiv preprint arXiv:1511.02680, 2015.
Lowe D.G., "Object Recognition From Local Scale-invariant Features," Computer vision, The proceedings of the seventh IEEE international conference on 1999, vol. 2, pp. 1150-1157.
Mitzel D., et al., "Video Super Resolution Using Duality Based TV-l 1 Optical Flow," Joint Pattern Recognition Symposium, 2009, pp. 432-441.
Pérez et al., "Poisson Image Editing," in ACM Transactions on Graphics (TOG), 2003, vol. 22, No. 3, pp. 313-318.
Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.
Suzuki et al., "Inter Frame Coding with Template Matching Averaging," in IEEE International Conference on Image Processing Proceedings (2007), vol. (III), pp. 409-412.
Szeliski R., "Computer vision: algorithms and applications," Springer Science & Business Media, 2010.
Thaipanich T., et al., "Low Complexity Algorithms for Robust Video frame rate up-conversion (FRUC) technique," IEEE Transactions on Consumer Electronics, Feb. 2009, vol. 55 (1),pp. 220-228.
Xiao J., and Quan L., "Multiple View Semantic Segmentation for Street View Images," 2009 IEEE 12th International Conference on Computer Vision, 2009, pp. 686-693.
Xiong Y., et al., "Gradient Domain Image Blending and Implementation on Mobile Devices," International Conference on Mobile Computing, Applications, and Services, Springer Berlin Heidelberg, 2009, pp. 293-306.
Zhai et al., "A Low Complexity Motion Compensated Frame Interpolation Method," in IEEE International Symposium on Circuits and Systems (2005), pp. 4927-4930.
Zhang., "A Flexible New Technique for Camera Calibration" IEEE Transactions, dated Nov. 2000, vol. 22, No. 11, pp. 1330-1334.
ECN L1 PM Substates with CLKREQ approved Aug. 23, 2012.
PCI Express base Specification Revision 3.0, published Nov. 10, 2010.
PCI Express Base Specification Revision 3.1, published Oct. 8, 2014.
Universal Serial Bus, Communication Class, Subclass Specifications for Network Control Model (NCM) Devices; Revision 1.0 (Errata 1), Nov. 24, 2010, published by USB Implementers Forum, Inc.
Jackson, Budruk: "PCI Express Technology", Sep. 2012 (Sep. 2012), MindShare Press, XP002777351, pp. 49,86,87,712-723.

\* cited by examiner

METHODS AND APPARATUS FOR LOADING FIRMWARE ON DEMAND

PRIORITY

This application claims priority to U.S. Provisional patent application Ser. No. 62/301,487 filed Feb. 29, 2016 of the same title, the foregoing being incorporated herein by reference in its entirety.

RELATED APPLICATIONS

This application is related to commonly owned and co-pending U.S. patent application Ser. No. 15/273,398 entitled "Methods and Apparatus for Loading Firmware On Demand" filed contemporaneously herewith on Sep. 22, 2016, as well as commonly owned and co-pending U.S. patent application Ser. No. 15/273,432 entitled "Methods and Apparatus for Locking At Least a Portion of a Shared Memory Resource" filed contemporaneously herewith on Sep. 22, 2016, each of the foregoing being incorporated herein by reference in their entireties.

This application is also related to commonly owned and co-pending U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS", filed Oct. 8, 2015; Ser. No. 14/879,027 entitled "METHODS AND APPARATUS FOR MANAGING POWER WITH AN INTER-PROCESSOR COMMUNICATION LINK BETWEEN INDEPENDENTLY OPERABLE PROCESSORS", filed Oct. 8, 2015; Ser. No. 14/879,030 entitled "METHODS AND APPARATUS FOR RECOVERING ERRORS WITH AN INTER-PROCESSOR COMMUNICATION LINK BETWEEN INDEPENDENTLY OPERABLE PROCESSORS", filed Oct. 8, 2015; Ser. No. 15/271,102 entitled "Memory Access Protection Apparatus and Methods", filed Sep. 20, 2016; and Ser. No. 15/271,109 entitled "Memory Access Protection Apparatus and Methods", filed Sep. 20, 2016, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The disclosure relates generally to the field of electronics devices, as well as networks thereof. More particularly, in one exemplary aspect, the disclosure is directed to methods and apparatus for retrieving and loading firmware for execution on a processor with limited access to memory. Various aspects of the present disclosure are directed to, inter alia, dynamically fetching on-demand firmware, storing archival firmware, and/or evicting unused firmware from memory.

DESCRIPTION OF RELATED TECHNOLOGY

The consumer electronics industry continuously strives to meet consumer demands for increased device functionality. In order to keep costs low and maximize supply chain diversity, most manufacturers design their consumer electronics devices to be constructed from generic and/or commodity components that are sourced from a number of $3^{rd}$ party vendors. Thus, manufacturers have historically struggled to implement an increasing set of features on embedded platforms where components are sub-optimal (e.g., low memory resources, etc.)

Within this context, most processor architectures and accompanying firmware architectures are tightly optimized for operation with a specific memory structure by design to meet desired constraints and use cases (e.g., cost, power consumption, etc.) For example, certain memory technologies can inexpensively store large amounts of data but may be unable too slow to support high performance applications; other memory technologies can operate in high performance applications, but are prohibitively expensive and/or consume more power. As a brief aside, firmware is embedded software that is tightly coupled to device hardware and has been optimized to control, monitor, and manipulate data, based on the specific constraints of device hardware. Historically, the firmware of a device was rarely (or never) changed during normal operation; in recent history, however, updating firmware has become a commonplace solution to handle the changing demands of consumers.

From a device manufacturing standpoint, continuously updating firmware (e.g., by re-writing, modifying, and optimizing firmware) is an expensive, time-consuming and labor-intensive process. To these ends, improved methods and apparatus are needed for dealing with the shifting terrain of consumer desires and vendor component offerings, while minimally impacting firmware performance. Solutions are needed that decouple firmware from memory designs and limitations.

SUMMARY

The present disclosure satisfies the foregoing needs by providing, inter alia, methods and apparatus for retrieving and loading firmware for execution on a processor with limited access to memory.

In a first aspect, a method for locking a shared memory is disclosed. In one embodiment, the method includes attempting to lock at least a portion of the shared memory by a first processor; verifying that a second processor has not locked the at least the portion of the shared memory; when the at least the portion of the shared memory is successfully locked via the verification that the second processor has not locked the at least the portion of the shared memory, executing a critical section; and otherwise attempting to lock the at least the portion of the shared memory at a later time.

In a second aspect, a method for initializing firmware for execution on a processor with limited access to memory is disclosed. In one embodiment, the method includes executing a portion of a firmware image; generating a page fault when a memory access for the firmware image is outside of a resident memory range, the page fault configured to cause a host processor to service the page fault; and resuming execution of the firmware image.

In a third aspect, a method for initializing firmware for execution on a processor with limited access to memory is disclosed. In one embodiment, the method includes resetting a peripheral processor; establishing a physical link interface; initializing a secondary storage; loading the peripheral processor with an initial image; and causing the peripheral processor to execute the initial image.

In a fourth aspect, an electronic device is disclosed. In one embodiment, the electronic device is configured to lock at least a portion of a shared memory. The electronic device includes a host processor; a peripheral processor; a physical bus interface configured to couple the host processor to the peripheral processor; and a software framework configured to be executed by the host processor and the peripheral processor. The software framework includes logic configured to: attempt to lock the at least the portion of the shared memory; verify that the peripheral processor has not locked the at least the portion of the shared memory; when the at least the portion of the shared memory is successfully locked via the verification that the peripheral processor has not locked the at least the portion of the shared memory, execute a critical section of the shared memory; and otherwise attempt to lock the at least the portion of the shared memory at a later time.

In an alternative embodiment, the electronic device is configured to initialize firmware for execution on a processor with limited access to memory. The electronic device includes a host processor; a peripheral processor; a physical bus interface configured to couple the host processor to the peripheral processor; and a software framework configured to be executed by the host processor and the peripheral processor. The software framework includes logic configured to: execute a portion of a firmware image located within a primary memory of the peripheral processor; generate a page fault when a memory access for the firmware image is outside of a resident memory range located within the primary memory of the peripheral processor, the page fault configured to cause the host processor to service the page fault; service the page fault by the host processor; and resume execution of the firmware image by the peripheral processor.

In yet another alternative embodiment, the electronic device is configured to initialize firmware for execution on a processor with limited access to memory. In one embodiment, the electronic device includes a host processor; a peripheral processor; a physical bus interface configured to couple the host processor to the peripheral processor; and a software framework configured to be executed by the host processor and the peripheral processor. The software framework includes logic configured to: reset the peripheral processor through use of the host processor; establish a communication link between the peripheral processor and the host processor using the physical bus interface; initialize a secondary storage; load the peripheral processor with an initial image; and cause the peripheral processor to execute the initial image.

In a fifth aspect, a host processing device is disclosed. In one embodiment, the host processing device includes a processing unit; an execution memory in signal communication with the processing unit; and a physical bus interface in communication with the processing unit, the physical bus interface configured to be coupled to a communications link. The host processing device is further configured to: globally lock a shared memory resource by use of a global locking mechanism, the shared memory resource configured to service the host processing device and at least one other processing device; lock one or more paging table entries within the shared memory resource by use of a paging table entry locking mechanism; and update tracking information associated with the one or more paging table entries subsequent to the global lock and subsequent to the one or more paging table entry locks.

In a sixth aspect, a peripheral processing device is disclosed. In one embodiment, the peripheral processing device includes a processing unit; an execution memory in signal communication with the processing unit; and a physical bus interface in communication with the processing unit, the physical bus interface coupled to a communications link. The peripheral processing device is further configured to: execute a portion of a firmware image located within the execution memory; generate a page fault when a memory access for the firmware image is outside of a memory range associated with the execution memory, the page fault configured to cause a host processor to service the page fault; and resume execution of the firmware image.

In an alternative embodiment, the peripheral processing device includes a processing unit; a physical bus interface in communication with the processing unit, the physical bus interface coupled to a communications link; an array of registers that is coupled to the communications link; and a memory structure that is coupled to the communications link. The peripheral processing device is further configured to: receive a reset signal from a host processor via the communications link; receive a portion of a firmware image from the host processor while the peripheral processing device is held in a reset condition; and execute the portion of the firmware image.

Other features and advantages of the present disclosure will immediately be recognized by persons of ordinary skill in the art with reference to the attached drawings and detailed description of exemplary embodiments as given below.

All Figures© Copyright 2015-2016 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While these embodiments are primarily discussed in the context of an inter-processor communication (IPC) link, it will be recognized by those of ordinary skill that the present disclosure is not so limited. In fact, the various aspects of the disclosure are useful in any device or network of devices that may benefit from on-demand loading of various firmware images, as is disclosed herein. Further, while the following embodiments describe specific implementations of e.g., dedicated address spaces, legacy support capabilities, and specific protocols, those of ordinary skill in the related arts will readily appreciate that such descriptions are purely illustrative.

Exemplary Processor and Memory Architecture

Figure 1:
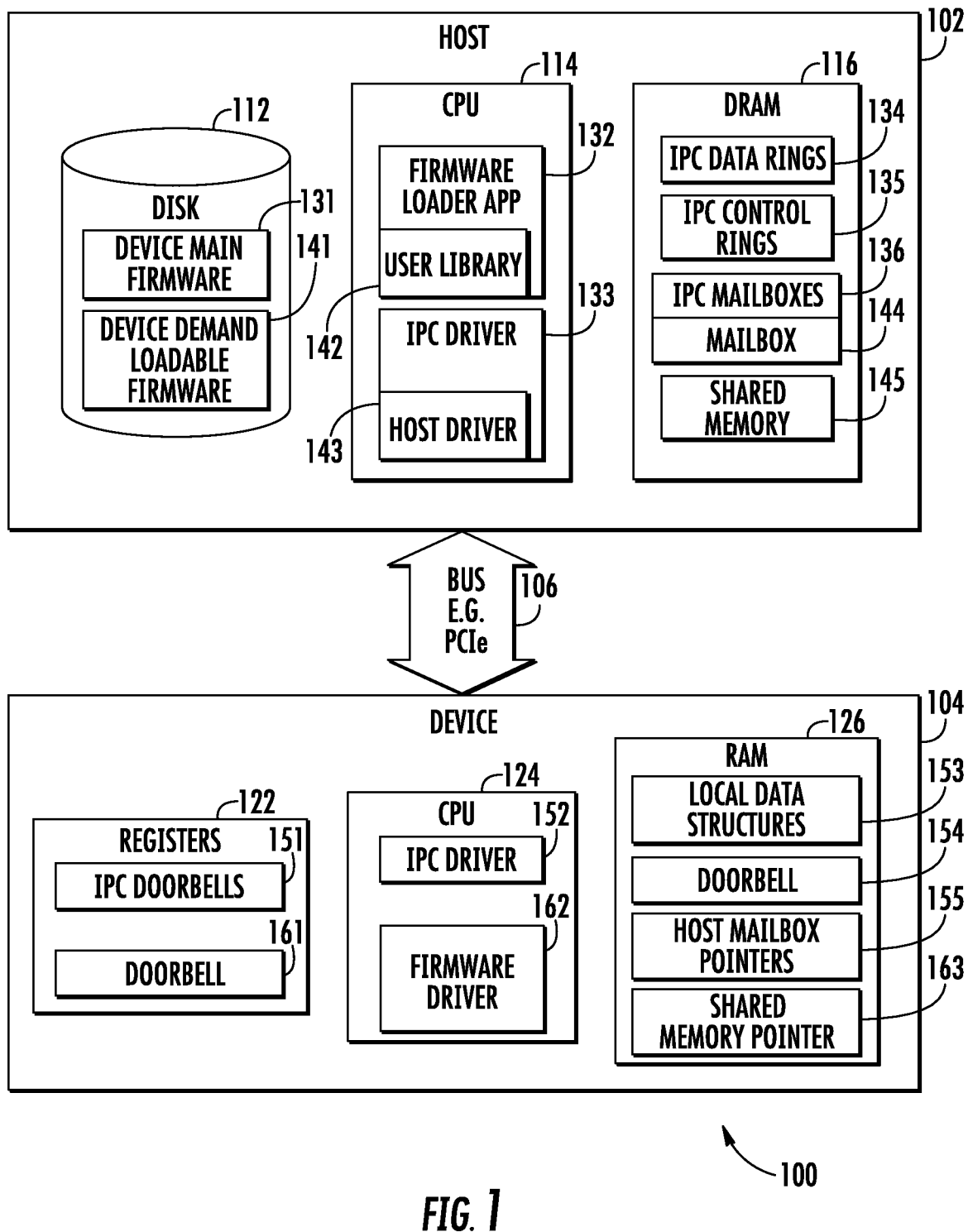
FIG. 1 is a logical representation of a software framework useful for illustrating various principles described herein.

FIG. 1 illustrates one logical representation of a software framework 100 useful for illustrating various principles described herein. The software framework 100 is executed in tandem via a host processor 102, a peripheral device processor 104, and a physical bus interface 106. The software framework 100 may be included in any number of consumer electronic devices including, for example, smart phone devices (such as, without limitation, the iPhone), personal media devices (such as, without limitation, the iPad/iPod), personal computing devices (such as, without limitation, the MacBook Pro and MacBook Air) and literally any other computing device having a host processor, one or more peripheral processors, and a shared memory.

Within this context, exemplary methods and apparatus are now described which support firmware provisioning between independently operable processors. The following discussions will be described in reference to a "host" processor, and an "peripheral" (or "peripheral device") processor. For reasons which will become apparent below, it is appreciated that the designation as to host or peripheral processor is used to simplify and/or clarify the following explanations, and does not imply existing host or peripheral functionality, or that such roles cannot be reversed.

As used herein, the term "logical" and "virtual" are interchangeably used to refer to, without limitation, an abstraction (typically performed in software or machine logic) to represent physical mechanisms, attributes or functionalities as a data structure. For example, as used herein a "logical bus interface", "virtual bus interface", etc. refers generally to an abstraction or representation of a bus interface as a series of data structures. In contrast, as used herein a "physical bus interface" refers to the physical mechanisms, attributes or functionalities of a physically tangible bus interface.

In one implementation, the host processor 102 includes an applications processor (AP), and the peripheral processor 104 includes a baseband processor and/or a wireless modem. The applications processor is primarily responsible for executing consumer applications based software; common examples of consumer applications include operating systems, graphical user interfaces (GUIs), third party applications, etc. As used herein, the term "wireless" includes, without limitation, Long Term Evolution/Advanced (LTE and LTE-A) technology, devices implementing IEEE-Std. 802.11 (any variants thereof), PAN technology such as e.g., Bluetooth or IEEE Std. 802.15.4, "ZigBee", near field communication/RFID, WiMAX (IEEE 802.16), WMANs, 3G cellular (e.g., WCDMA, 3GPP, 3GPP2, and GSM and improvements thereon, and ISM band devices.

As shown in FIG. 1, the host 102 includes a bulk storage memory (disk) 112, a processor 114 (which includes onboard execution memory) and a cache memory 116 (dynamic random access memory (DRAM)) that includes a firmware specific shared memory 145. The peripheral device 104 includes an array of registers 122, a processor 124 and a cache memory 126.

As a brief aside, for the purposes of clarity, the term "primary memory" refers to memory that is directly coupled to the processor for firmware execution. For example, as shown in FIG. 1, the peripheral device's primary memory includes both onboard execution memory (not shown) as well as its directly coupled cache memory 126. As used herein, the term "secondary memory" refers to memory that stores a portion of the firmware that is cached for on-demand access. For example, as shown in FIG. 1, the firmware specific shared memory 145 operates as a secondary memory for the peripheral device 104. As used herein, the term "tertiary memory" refers to memory that stores the entire firmware image (including archival portions of firmware). For example, as shown in FIG. 1, the bulk memory 112 operates as a tertiary memory for the peripheral device 104.

As a brief aside, "bulk" memory is generally characterized by relatively long access times, non-volatile storage capabilities, and relatively inexpensive cost per bit of memory stored. Bulk storage memory is primarily useful for storing data over long periods of time cheaply and with low power consumption. In contrast, "on-demand cache" memory (which is distinct from the execution cache) is generally characterized by high performance access times, volatile storage, and more expensive cost as a function of memory. Lastly, "execution" memory is memory that is locally resident to, managed, and accessed, by its corresponding processor; execution memory has the highest performance (and correspondingly most power consumption) and relative cost per bit. As also shown, "registers" are specialized logic structures (with memory-like properties) that can be accessed via dedicated processor hardware; registers are commonly used for special purpose accesses e.g., cross processor communication, interrupt services, non-memory functions, etc.

In one exemplary embodiment, the host 102, peripheral device 104, and physical bus interface 106 operate according to a communication protocol, via the inter-processor communication (IPC) link, as described in commonly owned and co-pending U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS", filed Oct. 8, 2015, previously incorporated by reference in its entirety. In one exemplary embodiment, the communication protocol may be a memory-mapped interface which is configured to enable one processor to access the other processor via native memory accesses (inter-processor communications are handled identically to memory accesses). In other embodiments, the communication protocol may operate according to a specialized channel and/or packet protocol (e.g., inter-processor communications are transacted via an intermediary communication stack, etc.) While the following discussions of the software framework 100 are described in the context of a memory-mapped physical bus interface between the host and peripheral device, artisans of ordinary skill in the related arts will readily appreciate that the framework is agnostic to the specific implementations e.g., of the host, peripheral device, and physical bus interface, the foregoing being purely illustrative.

Generally, the host processor controls access to bulk memory; for example, the host processor may be coupled to a bulk memory for non-volatile storage of computer programs on non-transitory computer readable medium. During normal operation, computer instructions are retrieved from bulk memory, and stored in the much faster (but volatile) execution memories of the host processor and peripheral processor for execution. For example, the host processor's operating system software image must be fetched from bulk memory (either in part, or whole), and executed from the execution memory. In one embodiment, the host 102 also stores the peripheral device's firmware in bulk memory. Thus, the peripheral processor must first be loaded with its firmware from the host's non-volatile bulk memory in order to operate.

While the illustrated embodiment depicts a peripheral processor that has no non-volatile memory of its own, it is appreciated that other device configurations may include a non-volatile memory for peripheral processor operation, or a portion thereof (thereby decoupling the peripheral processor from host processor execution).

In one exemplary embodiment, the physical bus interface operates according to one or more buffers that are controlled by the host processor and/or peripheral processor. As described in commonly owned and co-pending U.S. patent application Ser. No. 14/879,024 entitled "METHODS AND APPARATUS FOR RUNNING AND BOOTING AN INTER-PROCESSOR COMMUNICATION LINK BETWEEN INDEPENDENTLY OPERABLE PROCESSORS", filed Oct. 8, 2015, previously incorporated by reference in its entirety, the physical bus interface driver 133 of FIG. 1 is configured to transfer data that is stored in the data rings 134, based on the control ring 135. A mailbox 136 enables the host or peripheral device to initiate (and/or terminate) data transactions across the physical bus interface 106 via a doorbell register 151 of the peripheral device. Still other buffer based interfaces may be substituted with equivalent success, given the contents of the present disclosure.

For example, in order to transfer data to the peripheral processor, the host processor executes a physical bus interface driver 133 that is configured to transfer one or more portions of the data via the physical bus interface 106. More directly, the physical bus interface driver 133 retrieves data from any of e.g., the host's execution, secondary, or tertiary memory, and writes into a number of data rings 134. The data is then transferred to the peripheral device in accordance with the control rings 135 which manage e.g., data flow, etc.

With regard to the peripheral device counterpart functions, the registers 122 include the doorbell registers 151 that directly correspond to the mailbox 136 of the host (and vice versa). The counterpart physical bus interface driver 152 of the peripheral device operates in conjunction with the physical bus interface driver 133 of the host to effectuate data transfers. Similarly, the local data structures 153, host ring pointers 154, and mailbox pointer 155 are configured to operate in conjunction with the corresponding memory mapped interface of the host.

Various aspects of the present disclosure are disclosed that enable on-demand firmware loading. More directly, the peripheral processor's firmware modules that are not needed should be stored into a "virtual" cache that is managed by the host processor (e.g., the secondary memory) or archived (e.g., in the tertiary memory), rather than loading them into the peripheral processor's execution memory. Within the context of FIG. 1, various logical software entities that enable on-demand firmware retrieval and storage are now described in greater detail. As shown, the host-side software framework 100 has been modified to further include: storage for a modified peripheral device main firmware 131 (which supports on-demand firmware retrieval), a modified firmware loader application 132, one or more peripheral device on-demand loadable firmware modules 141, a firmware specific user library 142, a firmware specific host driver 143, a firmware specific mailbox 144, and a firmware specific shared memory 145 (i.e., the secondary memory).

In one variant, the firmware specific host driver 143 is configured to work in concert with the counterpart physical bus interface driver 152 to provide access to the firmware specific shared memory 145. The firmware specific user library 142 provides the firmware specific host driver 143 a path to the filesystem. More directly, the firmware specific user library 142 includes data structures and executable instructions (e.g., the application program interfaces (APIs)) that enable the firmware and device drivers to interface with user-space applications and daemons, and vice versa. In one such variant, the firmware specific user library 142 may augment an existing firmware loading application to extend support for on-demand firmware loading. In other variants, the firmware loading application is a separate application with its own firmware specific user library 142.

Referring now to the peripheral device firmware that is stored within the host's bulk memory device, the firmware is segmented into two or more pieces: the modified peripheral device main firmware 131, and one or more peripheral device demand loadable firmware modules 141. The main firmware 131 is loaded onto the device at boot time via the modified firmware loader application 132; the main firmware 131 includes at least the firmware specific peripheral driver 162 and its dependencies.

As described in greater detail hereinafter, the one or more peripheral device on-demand loadable firmware modules 141 are supplemental portions of the software executable that can be brought in on-demand by the software framework. The one or more peripheral device demand loadable firmware modules 141 are ideally characterized by temporal locality (i.e., a constrained execution time, etc.) and modular (i.e., self-contained) operation. Modular operation allows the firmware to perform various functions while keeping only a subset of its total firmware image resident in the peripheral device's execution memory. As used herein, the term "modules" refers to a firmware image that has been modularized in accordance with its temporal locality of execution.

The firmware specific mailbox 144 is used by the firmware specific peripheral driver 162 to notify the physical bus interface driver 133 that a data transaction is pending for the firmware specific host driver 143. As will be explained in greater detail hereinafter, the high performance demands of run-time firmware execution may warrant preferential handling of requests for firmware modules and/or data.

The firmware specific shared memory 145 is the peripheral device's secondary memory (cache for on-demand firmware execution). In one embodiment, the firmware specific shared memory 145 is used as a backing storage for a page-fault handler or overlay manager operation. Generally, when the peripheral device has a page-fault or page-miss on the firmware executing from its primary memory, the peripheral device attempts to retrieve the appropriate data from its secondary memory. If the secondary memory also does not have the appropriate data, then the host processor must satisfy the requests from the archived firmware image (which includes both the main firmware 131 and/or the on-demand modules 141) stored within the tertiary memory 112.

Referring back to FIG. 1, the peripheral-side software framework 100 has been modified to further include: a firmware specific loading doorbell 161, a firmware specific peripheral driver 162, and a firmware specific shared memory pointer 163. In one variant, the firmware specific peripheral driver 162 manages the on-demand loadable firmware(s) 141. The firmware specific peripheral driver 162 determines whether a requested function is currently resident within the loaded firmware that is in the peripheral processor's execution memory, and loads the appropriate on-demand loadable firmware(s) 141 module when it is not present. As previously noted, the firmware specific peripheral driver 162 operates similar to a fault handler of a memory system. For example, in memory managed unit (MMU) variants, the firmware specific peripheral driver 162 operates as a page-fault handler; for overlay-based variants, the firmware specific peripheral driver 162 operates as an overlay manager.

The firmware specific loading doorbell 161 is a register that can be written by the firmware specific host driver 143 to notify the firmware specific peripheral driver 162 of an event that requires service. The firmware specific memory pointer 163 identifies the host memory address of the firmware specific shared memory 145.

Methods

Various aspects of the present disclosure are directed to enabling a peripheral processor to retrieve and load firmware for execution within the constraints of its memory. In one exemplary embodiment of the present disclosure, the peripheral processor is allocated a portion of the host processor's memory, as a logical secondary and tertiary memory for memory cache operation. The described embodiments enable the peripheral processor to support much larger and more complex firmware, without requiring a dedicated memory cache for the peripheral processor (e.g., thereby reducing bill of materials (BOM) cost and minimizing physical footprint). Moreover, artisans of ordinary skill in the related arts will readily appreciate, given the contents of the present disclosure, that reducing memory size requirements of peripheral processors enables manufacturers to purchase commodity components for use with existing host processors, thereby reducing the requirements for costly customization, and/or single-sourcing vendors, etc.

Within the context of FIG. 1, consider a peripheral processor that has 500 KB of primary execution memory, which executes from a complete firmware image of 2 MB (stored in tertiary memory) of which 1 MB is stored in secondary memory for fast access. In one such example, the complete firmware image has been further subdivided into 4 KB "pages." As the peripheral processor executes the firmware that resides in its primary execution memory, the firmware may occasionally reference a page that is not within the 500 K of primary execution memory; under such situations the peripheral processor retrieves the missing page for execution (either from the secondary memory or the tertiary memory).

Unfortunately, implementing the peripheral processor's virtualized memory cache via a hosted memory architecture introduces multiple complexities to firmware execution which require specialized solutions. For example, prior art host processors provide a complete firmware image to peripheral processors at boot and are ill-suited for dynamically loading firmware modules based on operation. Additionally, contention issues can arise in multi-processor systems that share common resources, thus firmware performance can be drastically affected by poor contention resolution schemes. To these ends, the following discussions provide solutions that enable cached firmware operation for a peripheral processor.

Initialization and Memory Configuration

As previously alluded to, under most processor architectures, the host processor manages device initialization (the so-called "boot" process). Traditionally, when the host first powers up, the peripheral processor is held in reset until the host has loaded the peripheral's entire firmware image into the peripheral's execution memory. In contrast, various embodiments of the present disclosure must support firmware images that are larger than the peripheral processor's execution memory; thus, the peripheral processor cannot be loaded with the complete image on boot. To these ends, the exemplary host processor loads the initial firmware host driver and the primary firmware image; thereafter, the peripheral processor can boot and fetch appropriate firmware modules on an as-needed basis.

Figure 2:
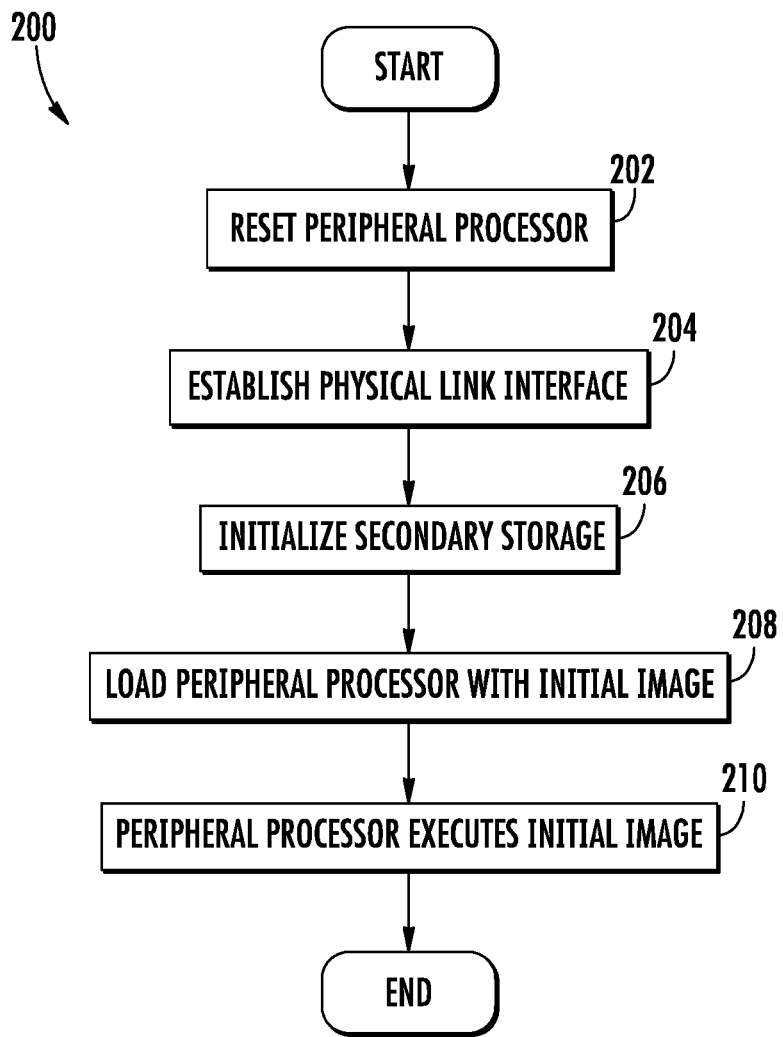
FIG. 2 is a logical flow diagram illustrating one generalized scheme for initializing firmware for execution on a processor with limited access to memory, in accordance with the present disclosure.

FIG. 2 is a logical flow diagram illustrating one generalized scheme for initializing firmware for execution on a processor with limited access to memory. In one exemplary embodiment, the firmware has been segmented into at least a first firmware host driver and a primary firmware image.

At step 202 of the method 200, the peripheral processor is reset. In some cases, the peripheral processor is held in reset when first powered on. In other cases, the peripheral processor is put into a reset condition by the host (so-called "soft reset"). In still other variations, the peripheral processor may be put into a hard reset based on a physical switch, button, toggle, etc.

During reset, the processor is halted from executing instructions. However, the processor's execution memory may be accessible, thereby enabling the host processor to load a firmware image into the peripheral processor's execution memory. In one exemplary embodiment, the firmware image includes a main firmware portion that includes at least the on-demand firmware peripheral driver and its dependencies. Other common components of the main firmware may include functions and/or data which are: necessary for initial peripheral device operation (e.g., initializing other components), basic to peripheral device operation (e.g., a protocol stack, operating system, etc.), commonly used during peripheral device operation, and/or selected based on user and/or network configuration.

In some cases, the peripheral processor's reset state may wipe out previously stored memory contents; in alternative cases, the peripheral processor's reset state may simply rewrite the peripheral processor's execution pointer (i.e., previous memory contents are retained but likely inaccessible).

At step 204 of the method 200, the host processor and the peripheral processor establish a physical link interface. In one exemplary embodiment, the physical link interface initialization is a component of the main firmware image, and is performed as part of the peripheral processor's boot process. In other embodiments, the physical link interface initialization is performed by the host processor as part of the host processor's boot sequence. In still other embodiments, the physical link interface may be configured for both the host and the peripheral by an external logic and/or memory.

In some cases, the physical link interface includes the configuration of a memory-mapped interface. In some variants, the configuration of the memory-mapped interface includes the allocation of a memory space and/or partitioning the memory space for specific use. For example, the memory space may include one or more data structures (e.g., pointers, buffers, etc.) In some variants the memory-mapped interface may additionally include configuration of one or more registers and/or interrupts. Artisans of ordinary skill in the related arts will readily appreciate that memory-mapped interfaces may be beneficial to increase performance speeds and/or to optimize operation between processors. However, memory-mapped interfaces may also introduce unexpected problems, for example when a first processor behaves unexpectedly, the first processor could directly write into the memory space of the second processor, thereby corrupting the second processor's operation, etc.

In other cases, the physical link interface includes the configuration of one or more channel interface drivers. Generally an interface driver is configured to encapsulate data transactions within packets (or similar data structure). Each processor of a channel interface is responsible for unpacking the packets and manipulating the data independent of the other processors. While packing/unpacking packets for a physical link suffers from additional networking overhead, each processor's operation is isolated from other processors, etc.

Common examples of physical link establishment operations for channel type interfaces include without limitation e.g., bus management, device discovery, bus arbitration, power management, clock recovery, synchronization, etc.

At step 206 of the method 200, the host processor initializes an area of shared memory as secondary storage for at least a portion of the peripheral processor's firmware image. In one exemplary embodiment, the entire firmware image is fetched from tertiary storage and stored within a secondary storage that is controlled by the host processor; alternatively, a portion of the firmware image is fetched and stored in secondary storage, and the entire firmware image is stored in tertiary storage.

In one such variant, the memory space is subdivided into discrete pages. As used herein, the term "page" refers to a section of memory which can be retrieved from memory as an aggregate whole. In one exemplary embodiment, a page is a fixed-length contiguous block of virtual memory; each page is described by a single entry in a page table that stores various bookkeeping information. Other implementations may support static and/or dynamically sized, contiguous and/or non-contiguous pages. The page table can be referenced by the peripheral processor to retrieve a page which does not exist within the peripheral processor's execution memory.

As a brief aside, if firmware tries to access a location in a page that is not held within the peripheral processor's execution memory, then the peripheral processor generates an exception called a page fault. The firmware peripheral driver is notified to load the missing page from the auxiliary store (e.g., the secondary memory) automatically. Generally, the request is serviced without notifying the firmware process; i.e., the firmware is unaware of page faults or the retrieval process. In this manner, the program can address a much larger "virtual" execution memory than the actual physical execution memory. Each transfer of a page to support firmware execution is referred to as paging or swapping.

In one exemplary embodiment of the present disclosure, the firmware image includes one or more loadable on-demand firmware modules. In one such variant, the on-demand firmware modules are fixed based on a default configuration. Generally, default configurations include important modules that are frequently used and/or time critical. In other embodiments, the on-demand firmware modules are selected based on one or more operational considerations (e.g., power, performance, size, running applications, etc). For example, a firmware image may be configured to include the most recently used firmware modules. In other examples, a different selection of firmware modules may be implicated based on e.g., running applications, historically run applications, security considerations, business considerations, etc.

Each firmware module is assigned a granular number of pages; for example, a firmware module of 7 KB, will require two 4 KB pages of space. The mapping of firmware modules to pages may be one-to-many and/or many-to-one; for example, each firmware module may require multiple pages. In other cases, multiple small firmware modules may reside on a single page. Moreover, artisans of ordinary skill in the related arts, given the contents of the present disclosure, will appreciate that virtually any N×M mapping of firmware to pages may be used with equivalent success.

As previously noted, the paging table entries include information useful for coordinating the management of pages between processors. For example, the paging table may include housekeeping bits for one or both of the host and peripheral processors. Common examples of coordination information include e.g., dirty bits to indicate whether a processor has modified a page (and thus requires synchronization), wired bits to prevent a page from being reclaimed or evicted to make space for a requested page, validity bits to indicate whether the contents of the page are valid, reference pointers (e.g., to the first page of a number of pages), length of contents, etc.

In one exemplary embodiment of the present disclosure, the paging table is stored in secondary memory and includes one or more locking mechanisms. As described in greater detail hereinafter, the locking mechanisms e.g., preclude access to one or more entries of the paging table during paging access so as to prevent contention over shared resources (see Locking infra).

At step 208 of the method 200, the peripheral processor is loaded with an initial image. In one such embodiment, the initial image includes a first firmware host driver and a primary firmware image. In one exemplary embodiment, the host processor loads the first firmware host driver and the primary firmware image into the execution memory of the peripheral processor and then releases the peripheral processor from reset. In other embodiments, the peripheral processor has a small bootloader (e.g., in a small read only memory (ROM) or other non-volatile memory) that enables the peripheral to fetch the first firmware host driver and the primary firmware image from the secondary memory.

At step 210 of the method 200, the peripheral processor executes the initial image. The primary firmware image may initialize various subsystems of the peripheral processor (e.g., memory configuration, subsystem initialization, etc.). As part of the primary firmware image, one or more additional modules of firmware may be requested; in order to satisfy these requests, the peripheral processor uses the firmware host driver to fetch the requested loadable modules from the secondary memory (see On-demand Firmware Execution, infra).

Figure 2A:
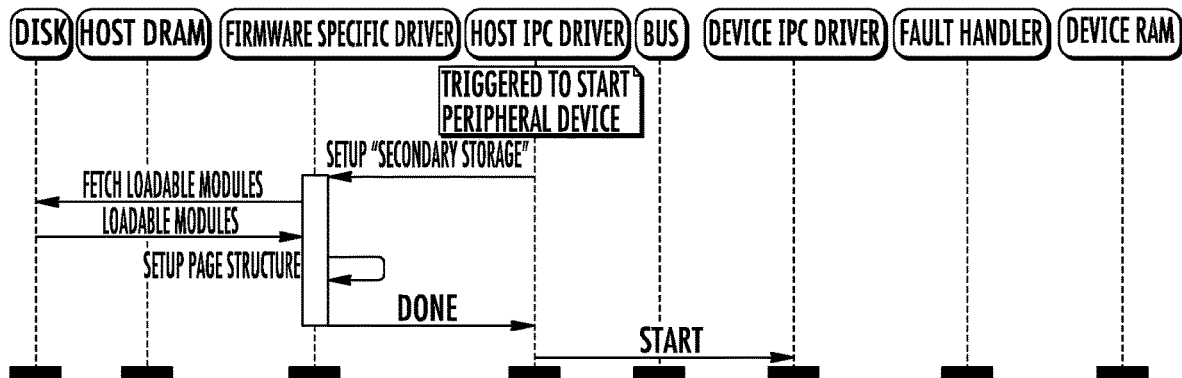
FIG. 2A is one exemplary logical sequence diagram of an exemplary boot sequence, in accordance with the present disclosure.

FIG. 2A illustrates one exemplary logical sequence diagram of an exemplary boot sequence. As shown, the physical bus interface driver 133 is triggered for peripheral device operation.

Responsively, the physical bus interface driver 133 allocates memory for, and/or configures a secondary storage of the firmware specific host driver 143. Specifically, as shown, the firmware specific host driver 143 configures its internal memory structures; this may include the firmware specific mailbox 144, and firmware specific shared memory 145. Additionally, during the configuration of the secondary storage, the firmware specific host driver 143 fetches the device main firmware 131 and one or more loadable modules 141 from tertiary memory 112; and writes them into the configured secondary storage. Finally, the execution memory of the peripheral processor is loaded with at least an initial image of the first firmware host driver and a primary firmware image.

Once the firmware specific host driver 143 has completed its configuration, the physical bus interface driver 133 can release the peripheral device 104 from reset, and the link between the peripheral device 104 and the host 102 (via the physical bus interface 106) is established or re-established.

Upon link establishment, the peripheral processor 124 executes the contents of its execution memory. Thereafter, the peripheral processor initializes its operation from the configured secondary storage. In some cases, the peripheral processor may also be initialized with generic firmware element(s) which are commonly used and/or seldom changed. In one exemplary embodiment, a memory region is allocated for the firmware specific shared memory 145. The firmware specific shared memory 145 is used during operation by the firmware specific peripheral driver 162 (e.g., the page-fault handler or overlay manager) as an addressing reference for the on-demand loadable firmware(s) 141.

Figure 3:
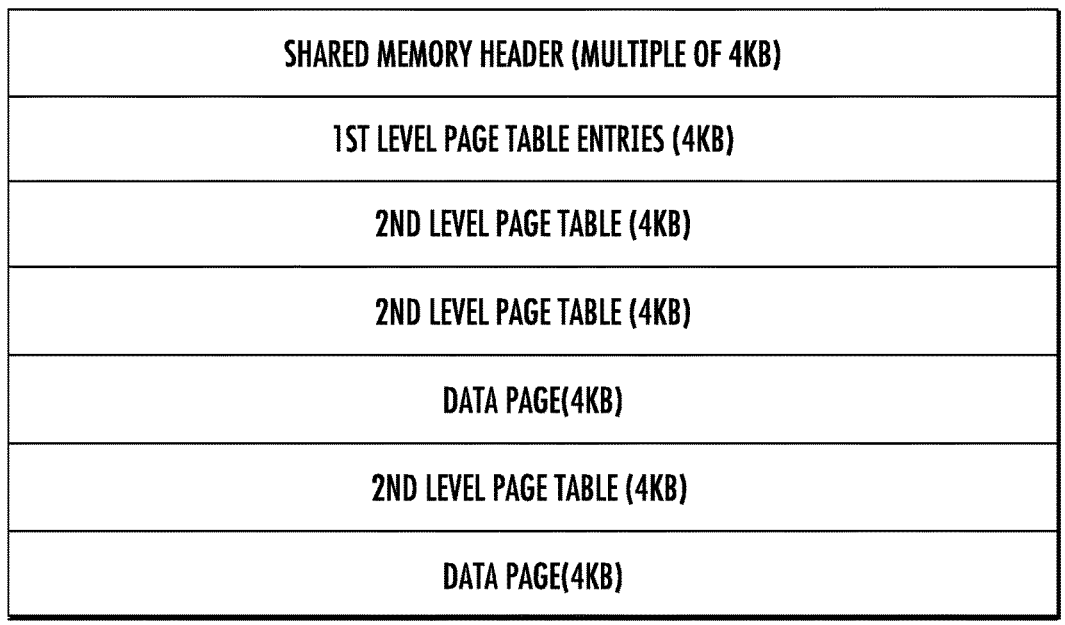
FIG. 3 is one example of a memory map useful in conjunction with the various principles described herein.

FIG. 3 illustrates one example of a memory map 300 useful in conjunction with the various principles described herein. Artisans of ordinary skill in the related arts, given the contents of the present disclosure, will readily appreciate that other memory map structures may be used with equal success, the example provided being purely illustrative.

As shown, the firmware specific shared memory 145 is divided into 4 K pages. The illustrated example includes at least four (4) types of pages, which are hierarchically organized: a shared memory header, a 1st level page table, a 2nd level page table and a data page.

In the illustrated embodiment, the shared memory header is the first page of the shared memory, and includes information that defines the structure of the memory map 300. In some cases, the shared memory header includes a configuration register in a memory mapped input/output (MMIO), located in the peripheral device registers 122, that identifies the location of the firmware specific shared memory 145 for the peripheral device (APPENDIX A provides exemplary field definitions for the shared memory and MMIO data structures). As previously noted, an MMIO is a mapping of a memory region into the memory map of the host. In this manner the peripheral device's native execution instructions can address the mapped region in the same manner as its own local memories. More generally, the shared memory header identifies the addressable location for the firmware specific shared memory 145, so that the processor can natively read and write values to the shared memory 145.

As shown, the $1^{st}$ level page table provides address locations for each of the $2^{nd}$ level pages. The number of entries of the $1^{st}$ level page table defines the number of possible $2^{nd}$ level pages; for example a 4 K page that supports 1024 entries can reference up to 1024 $2^{nd}$ level pages (APPENDIX B provides one exemplary field definition of a $1^{st}$ level page table).

Each $2^{nd}$ level page table defines one or more pages that store references to the data pages of an on-demand loadable firmware module 141. Each data page stores an on-demand loadable firmware module 141 or a portion thereof. For example, a 4 K $2^{nd}$ level page can store up to 1024 reference pointers to up to 1024 data pages (larger allocations will span multiple pages). Each data page can store up to 4 K of computer executable code. Artisans of ordinary skill in the related arts will readily appreciate, given the contents of the present disclosure, that page size can be selected based on design constraints e.g., to minimize on-demand page switching (larger page sizes), or minimize unused memory, etc. Moreover, while the disclosed embodiment envisions pages of equal size; artisans of ordinary skill in the related arts given the contents of the present disclosure, will readily appreciate that different page types may be differently sized.

In the foregoing example of FIG. 3, the firmware specific shared memory 145 is divided into pages which are accessed via a page table in the shared memory. The foregoing memory structure enables non-contiguous operation; e.g., pages that are contiguous in address space are not necessarily contiguous in the shared memory. In this manner, the secondary storage can support a much larger tertiary storage in system configurations where the secondary memory is not big enough to hold the full firmware image.

On-demand Firmware Execution

As previously noted, design assumptions for the consumer electronics space are rapidly changing. For example, modern firmware images are now significantly larger and support a wider variety of functionalities. Additionally, device manufacturers have increasingly designed devices around commodity components (e.g., wireless modems, etc.), that are flexibly customized for use within software. Based on current design trajectories, existing peripheral device processors are predicted to lack sufficient memory to support firmware images within the next few design iterations. Moreover, customizing peripheral processors is an expensive and undesirable proposition. To these ends, another aspect of the present disclosure is directed to on-demand firmware execution. During "on-demand" operation, the peripheral processor can retrieve and load firmware modules for execution on an as-needed basis, thereby minimizing the computer instructions that must be loaded into execution memory.

Figure 4:
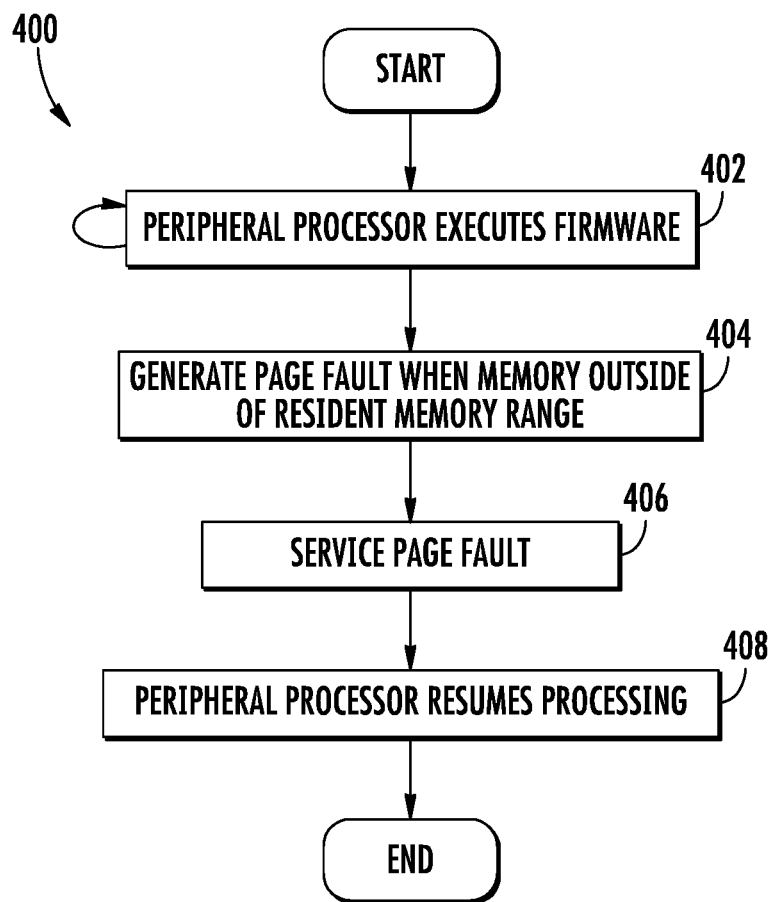
FIG. 4 is a logical flow diagram illustrating one generalized scheme for retrieving and loading firmware for execution on a processor with limited access to memory, in accordance with the present disclosure.

FIG. 4 is a logical flow diagram illustrating one generalized scheme for retrieving and loading firmware for execution on a processor with limited access to memory.

At step 402, the peripheral processor executes a portion of the firmware image from its primary memory. In some embodiments, the firmware may be a single process; in alternative embodiments, the firmware may have multiple processes. As used herein, the term "process" refers to a discrete and self-contained software process that includes a relevant set of instructions and data. In some embodiments, each process may be a single threaded application and/or multi-threaded applications. As used herein, a "thread" is a sequential set of instructions that must be executed sequentially to perform a software function; i.e., threads cannot be executed out of sequence. Multi-threaded processes can share process resources between each thread, but execute independently.

As used herein, the term "on-demand" refers to a portion of computer instructions that are currently executed and/or computer instructions that are queued for foreseeable execution. As used herein, the term "archive" and/or "archival" refers to a portion of computer instructions that are not currently executed and which are not implicated in foreseeable execution. Artisans of ordinary skill in the related arts, given the contents of the present disclosure, will readily appreciate the wide variety of execution prediction technologies used within the processing arts. Common examples include without limitation e.g., speculative execution, branch prediction, etc.

In some embodiments, the host can trigger advanced firmware fetching, which enables proactive loading of firmware by the peripheral processor. Ideally, the host can trigger firmware fetching without considering specific firmware architecture or layout requirements (where the mechanism is managed by the peripheral). In some variants, advanced firmware fetching is driven by host control commands, via the physical bus and/or higher order software layers (e.g., networking layers, transport layers, application layers, etc.) For example, in one such implementation, the peripheral processor may be instructed to perform a "touch-only" code sequence; during a touch-only code sequence, the peripheral traverses the code sequence for the actual code sequence, but does not execute or modify data. By performing the touch-only code sequence, the firmware will load the necessary firmware for the actual code sequence execution. In another such example, a firmware feature fetch command instructs the peripheral processor to load specific firmware modules for a particular feature. For instance, before the host prepares to sleep, the host can notify the peripheral to load any firmware it will need while the host is asleep.

In one exemplary embodiment, the on-demand portion of the firmware image includes one or more firmware modules which are stored within pages of memory. The peripheral processor is configured to execute one or more sets of instructions encompassed within the one or more firmware modules. Each page of on-demand firmware is represented by a corresponding entry of a paging table. In one illustrative example, the paging table includes e.g., address locations for a number of pages that contain firmware modules (see also, APPENDIX B).

In another embodiment, the on-demand portion of the firmware image includes one or more sections of computer instructions which are always available (i.e., which cannot be removed during execution). In some variants, the one or more sections of computer instructions which are always available are not separately stored within pages. In other variants, the one or more computer instructions which are always available are stored within pages that have been write protected (or otherwise have limited access).

In still another embodiment, various pages of memory can be dynamically configured for write protected or other limited access operation. For example, a firmware process may have specific performance requirements, and proactively protect its associated pages (thereby ensuring that the pages are always available for on-demand operation). Artisans of ordinary skill in the related arts will readily appreciate that protecting specific pages from eviction may, in some circumstances, affect overall cache operation; for example, evicting more frequently used pages (instead of protected pages) results in worse cache performance.

In still other embodiments, the paging table identifies and/or tracks whether each page of the firmware which is currently stored within the primary memory should be kept on-demand, or considered for archival. Tracking information may be useful for e.g., eviction (described in greater detail hereinafter). Generally, tracking information may be determined based on the relative usage of the firmware. For example, in some variants, the paging table records each usage of its pages (a running count of previous hits), where frequently used pages are prioritized for on-demand operation. In other variants, the paging table records when the last usage occurs (e.g., via a timestamp, etc.), where the least recently used (LRU) pages are more likely to be evicted (based on the assumption that instructions tend to refer back to previously called instructions, thus the least recently used pages are the least likely to impact performance if evicted). Various other schemes for determining on-demand/archival status are readily appreciated by those of ordinary skill, given the contents of the present disclosure. For example, some schemes may use a most recently used (MRU) metric for eviction (based on the assumption that instructions will not refer back to previously called instructions), etc.

In other variants, on-demand/archival status may be determined based on predictive considerations of the firmware rather than, or in combination with, tracking information. For example, in some variants, the current page's firmware execution may expressly announce its links to one or more other pages (via compiler inserted flags, etc.) In another example, the current firmware task or application may historically require one or more other pages for operation. In still other examples, the current applications process (running on the host processor) may notify the peripheral (e.g., via out-of-band messaging) that certain firmware modules are likely to be used and/or stored within one or more pages. Still other examples of predictive considerations are readily appreciated by those of ordinary skill in the related arts, the foregoing being purely illustrative.

At step 404, when an instruction executed from the primary memory references (or is implicated in future execution) a memory location that is outside the currently resident memory range, then the peripheral processor generates a page fault that is serviced at step 406.

In one embodiment, the host processor services the page fault. In one variant, the peripheral processor is idled while the page fault is serviced. In other multi-threaded and/or multi-processor variants, the peripheral processor may be allowed to execute other unrelated processes while the required instruction for the starved process is being loaded; artisans of ordinary skill in the related arts will readily appreciate that such execution cannot be dependent on the results of the missing instructions (e.g., the concurrent instruction execution must be associated with a different thread or process, etc.)

In alternative embodiments, the peripheral processor services the page fault by directly accessing the secondary memory. In some cases, the peripheral processor may directly interface with the secondary memory via e.g., a direct memory access (DMA) mechanism. In other cases, the peripheral processor may be required to actively arbitrate for access to the secondary memory with the host processor. In still other embodiments, the shared memory and/or other dedicated management system may internally manage access to the secondary memory.

In some embodiments, the processor services the page fault by retrieving the requested page from the secondary memory. However, in more complicated embodiments, servicing the page fault may require determining where the page is stored; e.g., within secondary, tertiary, or higher order memory. In some cases, the peripheral processor may not be aware of where the referenced memory location is stored; thus the host processor determines where the requested page is stored. For example, the host processor may search for the referenced memory location within a secondary memory and a shared tertiary memory. In other embodiments, the peripheral processor is aware of where the referenced memory location is stored and in some cases; the peripheral processor may have a data structure which tracks the controlling location of pages via e.g., the aforementioned page table, etc. For example, the peripheral processor may cross reference the page table to determine whether the requested page is stored in secondary memory or tertiary memory.

In some embodiments, the processor merely idles until the referenced page fault has been appropriately handled (where the host processor or other memory management entity services the page fault). Since memory access latency is directly related to the memory technology used for storage, the processor may also be able to predict its idle times in accordance with the type of page fault (e.g., a page stored in secondary memory has a shorter access time, than a page stored in tertiary memory, etc.) In some variants, predicted idle times may be useful for multi-process and/or multi-threaded applications. In other variants, predicted idle times may be useful for reduced power operation, etc. For example, the processor may be able to perform other functions or go to sleep while it is waiting for the requested page.

In some scenarios, the page fault mechanism checks whether the page is locked from access. As a brief aside, multiple processor systems that share common resources (such as memory), can encounter contention issues when two or more processors attempt to use the same common resource. In the case of the exemplary secondary memory, either the host or peripheral processor that is accessing a memory (for reading or writing) can only be assured of memory fidelity if the other processor is prevented from writing to it.

Various embodiments may use various types of locking procedures. For example, in some variants, the memory may be globally locked. In other variants, the memory may allow granular locking of pages, etc. In some variants, locking may prevent all access types; in other variants, the locking may only prevent certain types of accesses e.g., writes, reads, etc. Still other implementations may prioritize one processor over the other (e.g., preferentially allowing one processor to lock, etc.) Artisans of ordinary skill in the related arts, given the contents of the present disclosure, will readily appreciate the variety of locking mechanisms which may be used with equivalent success, the foregoing being purely illustrative.

In some scenarios, the page fault mechanism must make room for the new page by evicting an existing page. For example, where the execution memory or secondary memory is full (i.e., there are no empty pages) then one of the entries must be deleted to make room for the updated page. In other examples, the execution memory or secondary memory may be primed for incipient operation, so as to prevent delays due to cache accesses. Still other implementations may force evictions so as to optimize operation and/or remove stale data, etc.

As previously noted, the paging table may include tracking information useful for identifying which pages may be evicted. For example, entries with the lowest frequency of use may be removed during eviction. Theoretically, cache eviction strategies should attempt to remove cache entries that are not needed for the longest foreseeable time. In practical implementation, cache eviction typically assumes some type of behavior; for example, that the firmware repetitively executes similar operations, or conversely, that the firmware seldom executes the same operation, etc. Thus, common examples of eviction schemes that may be used include without limitation: (i) the least recently used (LRU), (ii) the most recently used (MRU), (iii) random entries, (iv) least frequently used, etc. Moreover, some eviction policies may protect certain entries from eviction. For example, some entries may not be removed due to e.g., power consumption and/or performance, etc.

In some embodiments, pages are only modified in execution memory during use (secondary and/or tertiary memories may not reflect the modifications). Accordingly, execution memory must be "written back" into the backing storages, so as to ensure that modifications are retained after the eviction.

At step 408, once the page has updated, the device can resume firmware operation. In some variants, the peripheral processor is woken from sleep or otherwise notified.

Overlay Manager

In one exemplary embodiment, the fault is handled with an overlay manager. As a brief aside, an overlay is a linker term that refers to a piece of code or data that can be executed out of a given overlay region. Overlays are a tool that can be used, for example, to dynamically load and execute portions of a firmware image as needed. In some implementations, overlays can be utilized without the help of a memory management unit (MMU). In an overlay-based solution, a subset of device firmware can be made up of modules that are linked as overlays into the firmware image. The content of each module is designed with temporal locality and firmware feature sets in mind so that each module is as self-contained as possible. There are two types of broad overlay manager types discussed in the present disclosure that enable the use of overlays to dynamically load the modules at, for example, run time. The first type of overlay managers is a so-called static overlay implementation.

In so-called static overlay implementations, overlay operation is characterized in that selection of an overlay region for each module is static and can be hardcoded by the programmer or determined heuristically at build time. A typical use is to have multiple such overlays that are linked to execute out of the same overlay region (the static nature of overlay operation greatly reduces compiler burden and execution complexity). This enables the firmware, with the aid of an overlay-manager entity, to dynamically load the necessary overlay before executing or accessing its contents.

In slightly more detail, each overlay has a unique load address, but multiple overlays can be interchangeably used within the same execution address. The computer instructions of an overlay are statically linked with code that is not in the overlay region; consequently, when compiling an overlay, the linker of the compiler ignores errors due to e.g., overlapping symbols in the overlays (which is a desired behavior). At run time, the firmware loader cannot determine which overlay (of the multiple options) to load, thus the firmware loader does not load overlays into the overlay region until they are needed. Instead, the overlays are held in a secondary storage of the host memory. The job of loading overlays is left to a run-time piece of code called the overlay manager. All the overlays of a peripheral start out as unmapped. After boot, if the peripheral executes code that needs to access a variable of an overlay, or call a function in an overlay, it must first ask the overlay manager to map in the relevant overlay. The overlay manager will un-map the overlay that was previously mapped in the corresponding overlay region, if any. If the overlay to be unmapped holds read-write data, its contents are written back to secondary storage (and/or tertiary storage) before un-mapping.

In one exemplary variant, some subset of the firmware image includes multiple modules, which are linked into overlays. If there is a single overlay region, only one of the firmware's modules can be resident in execution memory at a time. In some cases, this can be restrictive if a number of modules need to work together to accomplish a high-level work item with a single overlay region (i.e., the active module would have to be swapped with a different one several times over the course of getting a single high-level piece of work done). Consequently another exemplary variant uses more than one overlay region, thereby enabling multiple modules to be resident in execution memory simultaneously.

In one exemplary embodiment, the overlay manager uses a pair of data structures populated by the linker called the overlay table and the overlay region table. The overlay table has one entry per overlay and contains the load address and size of that overlay as well as the address to which it must be loaded when mapped in. The overlay region table has one entry per overlay region and cross-references into the overlay table (see e.g., APPENDIX C)

During a page fault, the individual pages of the firmware specific shared memory can be accessed via a page table in the shared memory. Pages that are contiguous in address space are not necessarily contiguous in the shared memory. Each overlay is associated with two (2) addresses: the virtual memory address (VMA) which multiple overlays may have in common, and the load memory address (LMA), which is unique to each overlay. Overlays can be retrieved from (or written back to) the firmware specific shared memory using their LMA addresses.

Figure 4A:
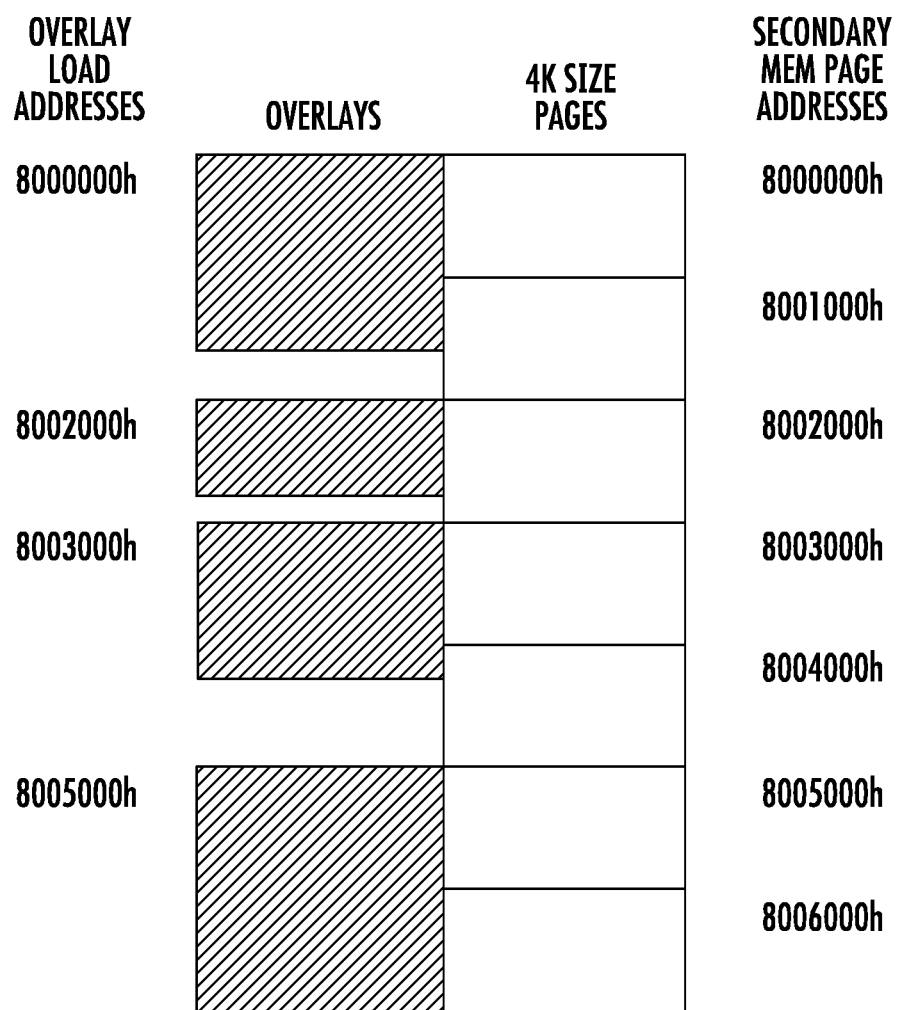
FIG. 4A is one exemplary firmware specific shared memory, useful in conjunction with the various principles described herein.
Figure 4B:
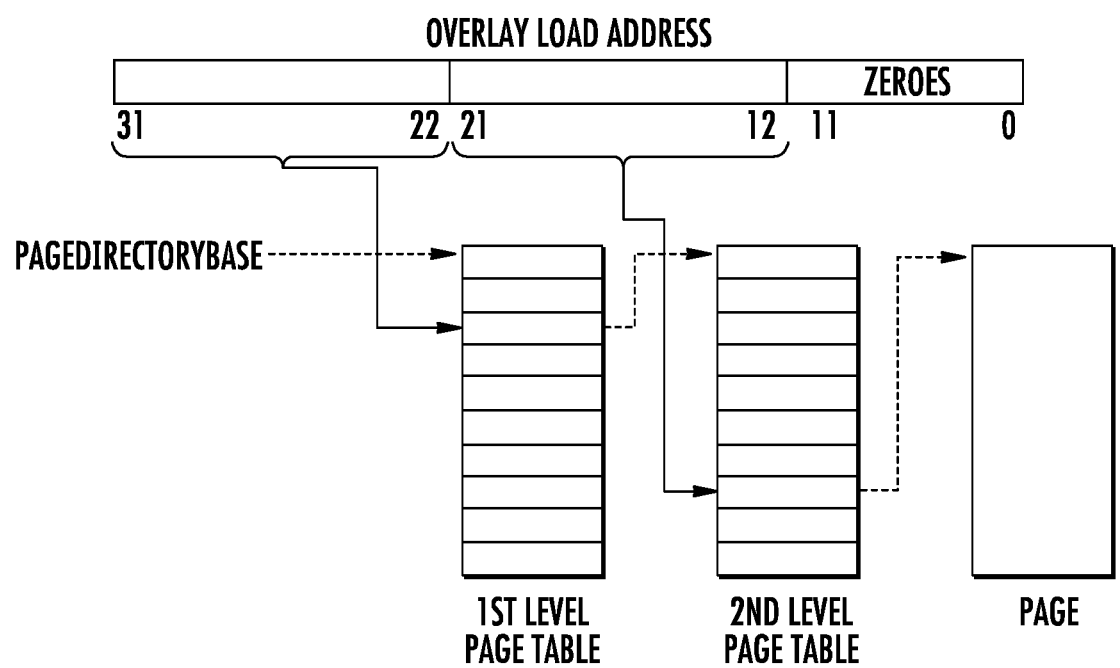
FIG. 4B is a logical block diagram describing an overlay LMA, useful in conjunction with the various principles described herein.

Referring now to FIG. 4A, one illustrative firmware specific shared memory is presented. As shown, the overlay starting at LMA 0x8000000h spans two 4 KB pages; the peripheral must retrieve both pages (starting at 0x8000000h and 0x8001000h) to get the contents of the overlay. FIG. 4B illustrates how a page is described based on its overlay LMA. As shown, the two step process requires identifying the 1st level (which is indexed by bits [31:22] of the LMA address), which references the appropriate $2^{nd}$ level page table. The index of the $2^{nd}$ level page is identified by the next 10 bits of the LMA [21:12]. The $2^{nd}$ level page table entry provides the reference to the destination page. As part of accessing the page, the device must acquire the page table entry lock (see Locking Operation).

The contents of the overlay table and the overlay region table can vary from one version of firmware to the next and depend on the number of overlay, overlay size, overlay regions, etc. The linker determines the VMA and LMA addresses of the overlays and generates the overlay table and overlay region table during software compilation. APPENDIX D illustrates one such linker script that sets up eight (8) overlays that are divided equally among two (2) overlay regions. As shown in APPENDIX D, the script sets up the overlays LMA addresses to start at 0x8000000h and aligns each overlay at 4 KB page boundaries.

In order to handle a page fault operation and on-demand firmware loading (e.g., when a function inside an overlay is called), the overlay must be loaded into the appropriate overlay region by the overlay manager. In one variant, the firmware is written such that every public function of the overlay is wrapped with a stub function that calls the overlay manager. The stub function: (i) gets the overlay that corresponds to the function (function loadOverlay), (ii) marks the overlay region as busy before entering the stubbed function and frees the overlay region after the stubbed function returns (function markOverlayBusy), and (iii) calls the stubbed function.

When loadOverlay is invoked, it checks if the overlay corresponding to the called function is already resident within the execution memory. If the overlay is not already loaded, then loadOverlay verifies that the overlay can be loaded in an on-demand manner. Additionally, if the overlay region is "dirty" (the current contents of the overlay region have not been updated in secondary storage), then dirty contents must be written back to secondary storage. Thereafter, the required overlay can be read from secondary storage and mapped into the overlay region.

The function markOverlayBusy is invoked before (and after) the overlay is in use to ensure exclusive access. For example, the overlay can be marked as busy to ensure that only the peripheral processor (and not the host processor) modifies the busy field of a mapped overlay when a function has been called, but has not yet returned. In order to ensure cache coherency, modifications to an overlay must be written back to the backing cache (e.g., the secondary and/or tertiary storages). In one such case, the modified overlay is marked as "dirty" (function markOverlayDirty) to ensure that the next time the overlay is unmapped, it is written out to secondary storage.

APPENDIX E includes exemplary pseudocode implementations of the aforementioned static overlay manager functions.

However, despite this reduction in compiler burden and execution complexity with static overlay managers, maintaining a per-module overlay region selection table may become cumbersome and may not necessarily scale easily as the number of modules or overlay regions increases. For example, the usage cases for each of the modules must be considered in order to determine which modules it is more (or less) likely to need to coexist with in device memory so that, for example, two modules that are often used in combination with one another do not end up being assigned to the same common overlay region in memory. Accordingly, the second type of overlay managers described herein are so-called dynamic overlay types. As previously alluded to, one such drawback of static overlay types is that any given overlay has only one address to which it must be copied and from which it must execute. As a result, having X regions may not be sufficient to ensure that all X overlays can be in use at the same time as, for example, the code-path may be such that all the overlays it needs may be such that a portion of the overlays it needs happen to be linked to execute out of the same overlay region out of those X regions, thereby rendering the other X-1 regions effectively useless. Dynamic overlays enable the location to which an overlay is copied to and executed from to be determined at runtime. In other words, when using dynamic overlay managers, the code needs to be made overlay position independent, thereby enabling these modules to be executed at any designated memory address without modification. However, as a result of the ability of modules to be dynamically associated with a given region of memory, a mechanism is needed in order to manage these dynamic allocations within memory.

The use of a so-called module call table (MCT) provides a layer of indirection between fixed position primary firmware and the variable position modules contained in the dynamic overlays. Each module has a small number of entry functions that are called from outside the module and a comparably larger number of internal functions that can only be called from other functions in the module. Every entry function in a module has a corresponding entry in the MCT. The entries of the MCT are functions that: (1) use the overlay manager to ensure the module whose entry function this entry corresponds to is loaded; (2) compute the address of the entry function into the module based on the address at which the module was loaded; and (3) call the entry function into the module.

In one or more implementations, the MCT may comprise one or more higher level computing codes (e.g., C, C++ and the like), or lower level computing codes, such as assembly files, whose entries are comprised of fixed position code that is linked with and becomes part of the main firmware and therefore must remain resident in device memory. The MCT can be manually generated, or it can be auto-generated by the device firmware build tools. To aid in the splicing of the MCT into the firmware to module code paths, a layer of indirection is inserted between specifically called out functions. For example, using a GNU toolchain, this mechanism involves using the -wrap option to the linker to specify which function(s) should be "wrapped". As yet another example, using an ARM toolchain, a similar result may be obtained by decorating the function to be wrapped with $$Super$$ and the function to wrap it with $$Sub$$. Aside from its involvement in calls from firmware to modules, the MCT is also used when one module needs to call into another. For example, when a module must provide one of its entry functions as a callback to main firmware or another module, it must use the function pointer of the entry functions corresponding MCT entry.

Table 1 reproduced below illustrates exemplary supported use cases of modules using dynamic overlays with partially position independent code. As a brief aside, partially position independent code indicates that all the functions within such code can call each other in a program-relative manner. For example, on certain architectures (such as ARM-based integrated circuits), this is the compiler's default preference. Contrast partially position independent code with fully position independent code in which the offsets between the sections at runtime must remain the same as they were at compile time. In other words, when compiling fully position independent code, the compiler will do everything necessary to ensure, for example, that all branches and data accesses are done relative to the program counter (PC) or instruction pointer (IP).

As a brief aside, when using partially position independent code and eliminating global offset tables, it becomes necessary to control the compiler's use of so-called short calls and long calls. Short calls are program-relative and therefore well suited to intra-module function calls. Long calls are absolute and therefore well suited to function calls from position independent modules to fixed position code (e.g., firmware). For example, one or more implementations may have the compiler default all function calls to long calls, and marking module internal functions with a short calls attribute. However, it is recognized that other compiler usage scenarios may dictate otherwise. For example, the compiler may default all function calls to short calls and mark module internal functions with a long calls attribute in certain implementations.

APPENDIX F includes exemplary pseudocode implementations of the aforementioned dynamic overlay manager functions.

Memory Management Unit

In an alternative variant, the page fault is handled with a memory management unit (MMU). In an MMU-based solution, the peripheral keeps a subset of the firmware image resident in execution memory, irrespective of the code layout. However, the performance can suffer if the firmware has not been optimized for temporal locality. More directly, since an MMU does not impose the strict fixation requirement of an overlay manager, the software must be expressly optimized for paging operation (functions should minimize references to off page memory locations). Otherwise, excessive cache hits from off-page hits will result in sub-optimal operation.

Locking Operation

Within the context of the present disclosure, the host processor and the peripheral processor have distinct and unrelated reasons for accessing the secondary storage. For example, in one exemplary embodiment, the peripheral processor accesses the contents of the secondary storage to retrieve firmware pages on-demand and also to update the tracking information (e.g., usage) of the firmware pages. In contrast, the host processor accesses the contents of the secondary storage to read the tracking information and, based on the tracking information, replace evict pages so that other more desirable pages may be stored.

As previously noted, safeguard procedures are necessary to ensure that the cache data is accurate. Artisans of ordinary skill in the related arts will readily appreciate that undesirable data hazards can occur in at least two (2) ways: (i) where one of the processors may attempt to read a memory, while the other processor writes to the same memory; and (ii) where one of the processors reads a "dirty" memory. So-called cache coherence refers to the consistency of data that is stored in various tiers of memory; when stale cached copies have not been updated, they are colloquially referred to as "dirty".

Within the context of the present disclosure, the foregoing data hazards may occur during certain operations of the on-demand firmware system. First, a data hazard could occur where the peripheral processor writes tracking data (stored in the page table) while the host processor reads it. Secondly, a data hazard could occur where the peripheral processor reads a page from the secondary memory, during an eviction process (i.e., where the host has control). Thirdly, a data hazard could occur where the host evicts a page that is dirty (i.e., before the peripheral has an opportunity to update the page). Each of these scenarios could be resolved by locking the shared memory.

TABLE 1

| Functionality | From module to firmware | From firmware to module | From module to itself | From module to a different module |
|---|---|---|---|---|
| function call | module calling firmware function | firmware calling module function | module calling internal function | module calling function of a different module |
| static local variable | Not applicable | Not applicable | static local variable in a module | Not applicable |
| global variable | module accessing firmware global variable | firmware accessing module global variable | module accessing own global variable | module accessing global variable of different module |
| callback function | module calling firmware callback | firmware calling module callback | module calling own callback | module calling callback in a different module |

However, traditional schemes for locking a shared memory ensure that only one processor can read or write to a memory at a time. Unfortunately, such generic locking schemes are ill-suited for on-demand firmware operation. In particular, the firmware of the peripheral processor has very stringent time requirements during operation, and the host processor and peripheral processor are not coordinated. Thus, locking out the peripheral processor whenever the host processor seeks to update the memory (and vice versa) is impractical. Ideally, locking schemes should minimize the occasions when one processor has locked the other processor out. Since the host and peripheral processor use different portions of the secondary memory for different functions, various embodiments of the present disclosure are directed to limiting the locking of the memory to only those portions which are required for the processor to perform its required tasks. Since the other portions of the memory are not locked, the other processor's accesses are minimally affected. By providing a multitude of specialized locking mechanisms, the described embodiments minimize lockouts.

In one exemplary embodiment, the locking process is divided into a global locking mechanism, and a page table entry (PTE) locking mechanism. In particular, the global locking mechanism is primarily used to read and/or update all the contents of the secondary memory together. For example, the global locking mechanism is used whenever the tracking information is being read or updated. As a brief aside, since the tracking information is used to determine which pages have been most frequently/least frequently used, a meaningful determination of usage requires that the tracking information is up-to-date for all of the pages. In contrast, for operations which only affect a single page table entry, the PTE locking mechanism ensures that only one processor can read and/or write to the single page table entry, however the other secondary memory elements remain unlocked.

Moreover, the locking process is also divided into time sensitive and time insensitive operations. As a brief aside, the host and the peripheral processor only perform a global lock when performing reads or updates on the tracking information for all of the page table entries. Since the tracking information is used by the host processor to evict and/or pre-fetch pages for on-demand operation, and is thus not time sensitive (i.e., time insensitive). For example, the peripheral updates the LRU tracking information periodically; if the peripheral processor skips an update there may be a slight (but still acceptable) reduction in cache performance. In another example, the host modifies LRU tracking information during eviction; however the peripheral processor's performance is not adversely affected if the host has to retry the LRU modification on the next cycle of its eviction operation. More generally, the global lock procedure can be performed on a so-called "best effort" basis (i.e., the lock is attempted, but not guaranteed).

In contrast, locking a paging table entry is limited to uses where either the host or the peripheral is modifying a specific page of the shared memory. However, if the host locks a paging table entry, the peripheral would be temporarily unable to read from the page (resulting in an undesirable firmware stall). Consequently, locking the paging table is a time sensitive operation.

In one exemplary embodiment, the global locking scheme protects any resources in shared memory that are not restricted by a device to acquire the PTE lock, including for example the page use indicator of page table entries (e.g., least recently used (LRU) entries, etc.) In one variant, the PTE lock specifically protects the corresponding page table entry's dirty bit, wired bit, and page use indicator (these data structures preclude access to the page table entry).

By separating the locking mechanism into two separate portions, various embodiments of the present disclosure can perform global time insensitive locking, and granular time sensitive locking of page table entries. More generally, various aspects of the present disclosure are directed to providing granular locking of a shared memory, so as to minimize the potential for lockouts during on-demand firmware performance. Additionally, by providing multiple mechanisms for locking the shared memory, those of ordinary skill in the related arts (given the contents of the present disclosure) will readily appreciate that the various locking mechanisms may have other functional differences.

For example, due to the differences in timing requirements, the locking schemes may have the same or different locking capabilities. In one such variant, the global lock and page table entry lock may both be implemented as a retry-later-lock (i.e., the processor can try at a later point to acquire the lock) using shared memory variables. In alternate variants, the global or page table entry lock may use so-called "spin locks" where the processor "spins" in an idle loop waiting for the lock to be released.

The following discussion of contention scenarios is provided to illustrate the various issues introduced by the aforementioned multi-facetted locking scheme, and various solutions thereto. While locking procedures are not uncommon for use in processor systems, the following novel contention scenarios cannot be handled with existing locking contention resolution and are uniquely resolved by the exemplary global and page table entry lock implementation.

Figure 5:
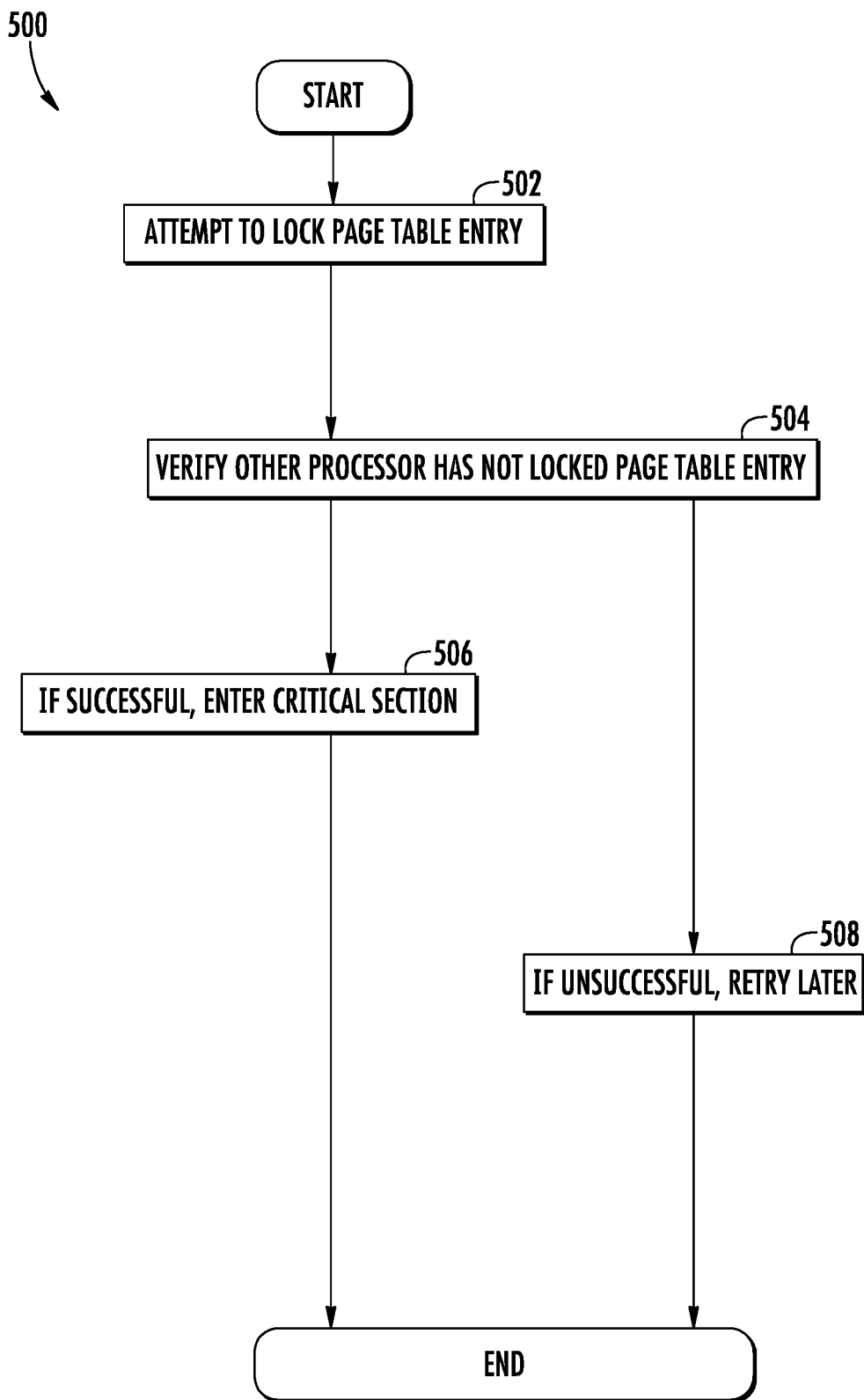
FIG. 5 is a logical flow diagram illustrating one generalized scheme for locking a paging table entry of a shared memory, in accordance with the present disclosure.

FIG. 5 is a logical flow diagram illustrating one generalized scheme for locking a paging table entry of a shared memory.

At step 502 of the method 500, the processor sets a semaphore flag indicating that it is attempting to lock the paging table entry. In one exemplary embodiment, the host and peripheral device contend for access to the firmware specific shared memory using a corresponding set of flag registers. Artisans of ordinary skill in the related arts will readily appreciate that other "semaphore" type schemes may be used with equivalent success to control access to the shared memory, the following description being purely illustrative. The peripheral device has a semaphore register PTE_D_flag which when asserted indicates that the peripheral device has successfully gained control of the shared memory; the host will refrain from accessing the paging table entry until the PTE_D_flag has been de-asserted. Similarly the host device has a counterpart semaphore register PTE_H_flag that indicates when the host has control. During operation, the peripheral and host will check both semaphores before writing to the shared memory (see also APPENDIX E for exemplary "pseudocode" implementations of the exemplary software process). Specifically, the peripheral must verify that the host does not currently have access and also that the peripheral has successfully reserved access (and vice versa).

In some embodiments, the semaphore register is also a read and writeable register that both processors can access. In other embodiments, the semaphore mechanism may be a writeable address for one processor, and readable by the other processor (but not vice versa). For example, the semaphore mechanism may be directly coupled to dedicated interrupts within the other processor, etc.

In some embodiments, the semaphore flag is stored within a dedicated register, or other memory mapped data structure. Other common mechanisms for signaling may be used with equal success; for example, in some cases, the semaphore may embodied as a message, packet, dedicated signaling lines, etc.

At step 504 of the method 500, the processor checks to verify that the other processor has not also attempted to lock the paging table entry. In some embodiments, the checking is performed by reading another other processor's semaphore flag. In other embodiments, verification may be provided via separate messaging e.g., an acknowledgement packet or signal. In some embodiments, the processor can infer that the other processor has not also attempted to lock the paging table entry, if its attempted lock was successful.

At step 506 of the method 500, if the processor has successfully locked the paging table entry, then it can enter its critical section. As used herein, the term "critical section" refers to software execution which requires exclusive access. Traditionally, exclusive access only prevents other processors from writing to the paging table entry. However, in some variants, exclusive access may additionally prevent other processors from reading from the paging table entry.

In one exemplary embodiment, the paging table entry lock is limited to time sensitive operations. The paging table entry lock allows the processor to read or modify the contents of the paging table entry. For example, the peripheral processor may read the contents of a firmware page and/or write back changes to the contents of the firmware page (to ensure cache coherency). In another example, the host processor may read back the contents of the firmware page, evict the contents of a firmware page, and/or load a different firmware page.

In some cases, the paging table entry lock may only exclude access from certain areas of the paging table entry. For example, as previously noted, certain pages of the shared memory area may have different functionalities (e.g., memory header, $1^{st}$ level page, $2^{nd}$ level page, data page, etc.) Complicated embodiments of the present disclosure may prevent certain accesses depending on e.g., page type, operational mode, access permissions, etc.

At step 508 of the method 500, if the other processor's flag is present, then the processor has unsuccessfully locked the paging table entry. In some embodiments, the processor will idle (or sleep) before re-attempting to lock the paging table entry. In other embodiments, the processor will divert its energies to other tasks before re-attempting to lock. For certain non-critical functions, the processor may simply abandon the access attempt.

In one such variant, the page table entry lock is implemented as a retry-later-lock. In some variants, the subsequent retry may be based on a timer. In some cases, the timer may be based on e.g., historic performance, power considerations, urgency, etc.

In other variants, the subsequent retry may be based on a notification e.g., received out-of-band, etc. For example, in some variants, a processor may receive an interrupt or other signaling, indicating that the lock may be retried. Such out-of-band signaling may be particularly useful where the processor performs other tasks, or sleeps while waiting for the lock.

In still other variants, the page table entry lock is implemented as a spin lock. During spin lock operation, the processor performs a null instruction while waiting for lock to be released. While spin locks are inefficient from a power consumption standpoint, spin locks allow a processor to immediately access the paging table once the lock is released.

The following detailed examples are illustrative examples of the principles described in the foregoing generalized discussion of the generalized scheme for locking a paging table entry of a shared memory.

Figure 5A:
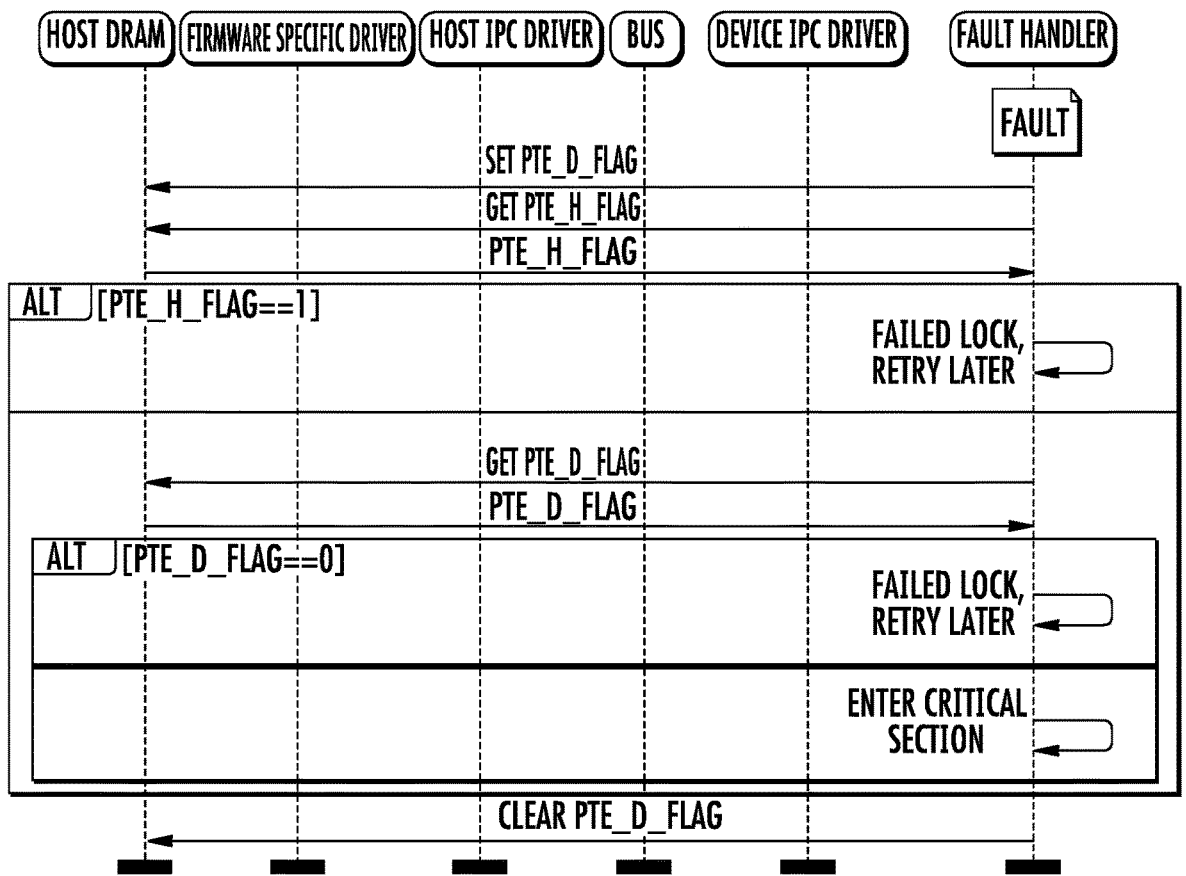
FIGS. 5A-5E are logical flow diagrams illustrating various contention scenarios illustrative of the generalized method of FIG. 5.

FIG. 5A illustrates one exemplary logical sequence diagram useful for describing the scenario where the peripheral device attempts to acquire the page table entry (PTE) lock without contention. As shown, the peripheral device acquires the PTE lock by setting a PTE_D_flag to one (1) (i.e., indicating to the host that the peripheral device is accessing the PTE). Before changing any of the paging table entries, the peripheral device verifies that the host is not also locking the paging table by reading the PTE_H_flag (a value of zero (0) indicates that the host is not accessing the paging table). Additionally, the peripheral device verifies that it has been granted control of the shared memory by reading the PTE_D_flag (a value of one (1) indicates that the peripheral has locked the paging table). Upon successful verification, the peripheral enters its critical section and after completion, releases the lock. A subsequent access by the host is also shown.

Figure 5B:
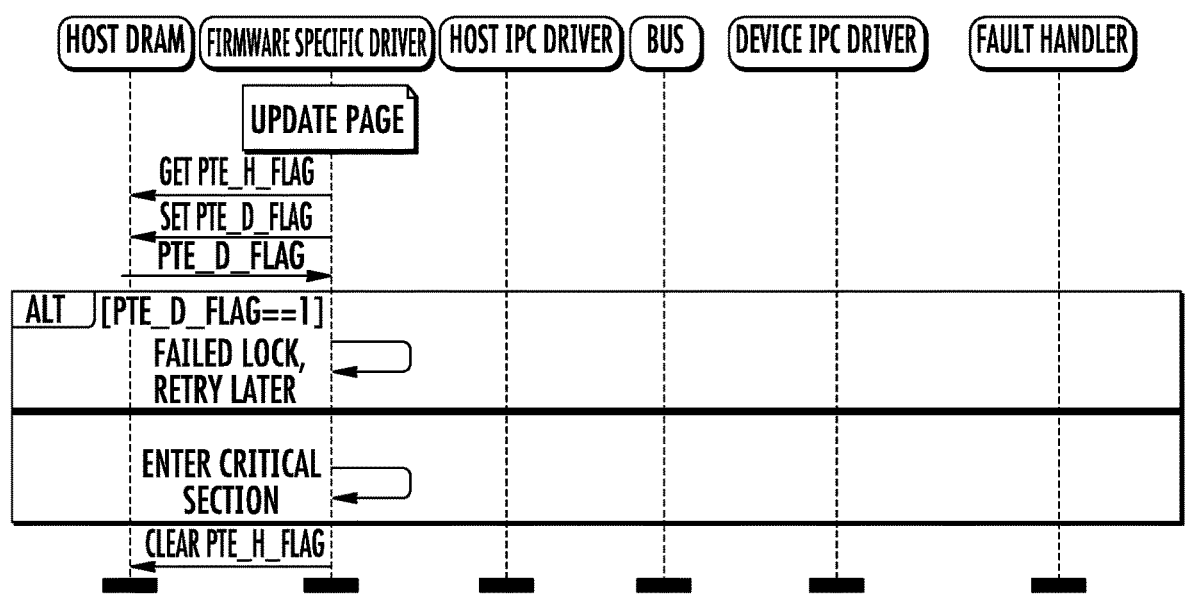

FIG. 5B illustrates one exemplary logical sequence diagram useful for describing the scenario where the host device attempts to acquire the page table entry (PTE) lock without contention. As shown, the host device acquires the PTE lock by setting a PTE_H_flag to one (1) (i.e., indicating to the peripheral that the host is accessing the PTE). Before changing any of the paging table entries, the host device verifies that the peripheral is not also locking the paging table by reading the PTE_D_flag (a value of zero (0) indicates that the host is not accessing the paging table). Upon successful verification, the host enters its critical section (e.g., writing to the firmware specific shared memory, updating contents, etc.) and after completion, releases the lock. A subsequent access by the peripheral is also shown.

In both FIGS. 5A and 5B, the host and the peripheral attempt to access the shared memory without contention. However, artisans of ordinary skill in the related arts will readily appreciate that contention may occur whenever transactions of the host and peripheral overlap. Since the neither the host nor the peripheral device timing is deterministic, multiple different contention scenarios must be considered depending on when and how the transactions are interleaved.

Figure 5C:
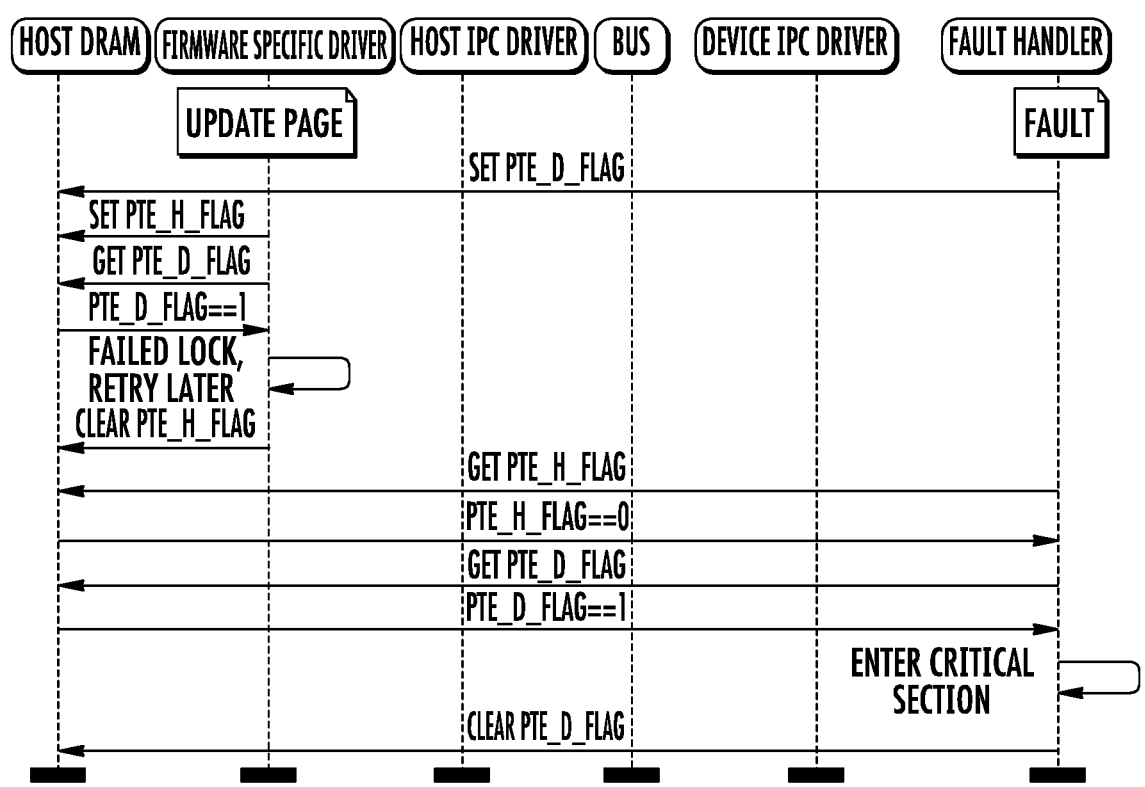

For example, FIG. 5C illustrates a first exemplary logical sequence diagram useful for describing the scenario where the host device and peripheral device attempt to acquire the page table entry (PTE) lock nearly simultaneously. As shown, the peripheral device attempts to set the PTE_D_flag slightly before the host device attempts to set the PTE_H_flag. Since the host sees that the PTE_D_flag is set, the host concludes that it failed to acquire the lock, and responsively it clears the PTE_H_flag. Thereafter, when the device verifies that the PTE_H_flag isn't set, the device has successfully acquired the lock and can enter the critical section. When the peripheral processor is done, it clears the PTE_D_flag to release the lock.

Figure 5D:
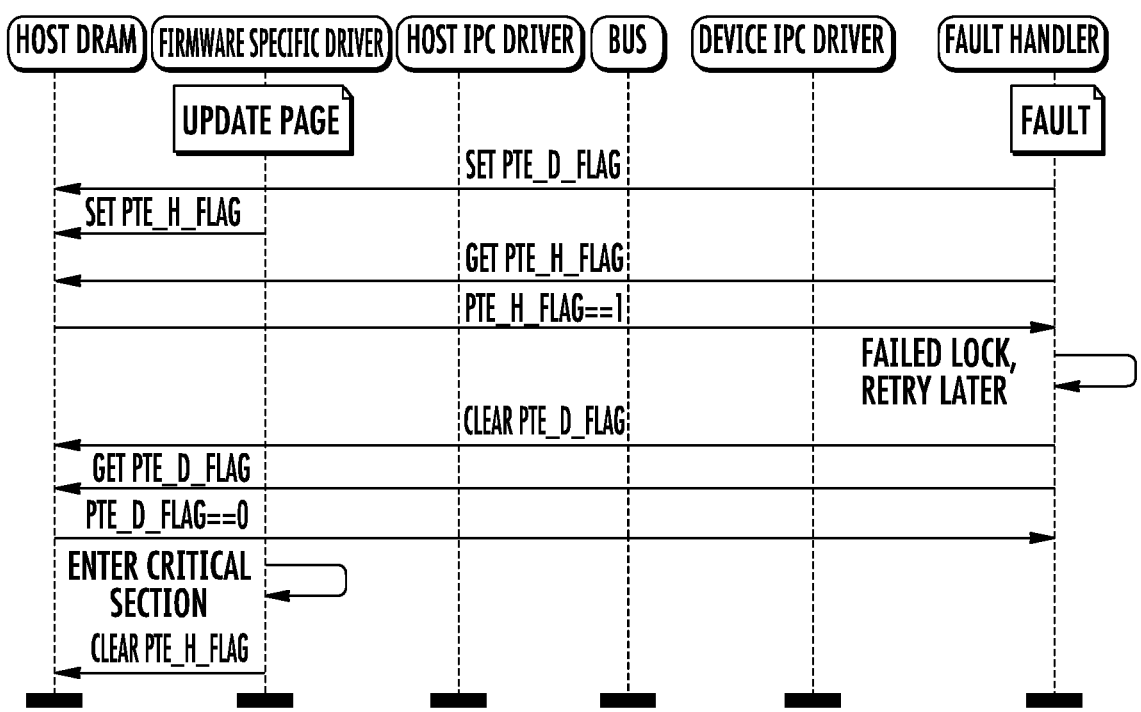

FIG. 5D illustrates a second exemplary logical sequence diagram useful for describing the scenario where the host device and peripheral device attempt to acquire the page table entry (PTE) lock nearly simultaneously. As with FIG. 5C, the peripheral device attempts to set the PTE_D_flag slightly before the host device attempts to set the PTE_H_flag. However, in this scenario the peripheral device checks PTE_H_flag which indicates that the paging table is locked by the host. Thereafter, the peripheral device concludes that it failed to acquire the lock, and responsively it clears the PTE_D_flag. Thereafter, when the host verifies that the PTE_D_flag isn't set, the host has successfully acquired the lock and can enter the critical section. When the host processor is done, it clears the PTE_H_flag to release the lock.

Figure 5E:
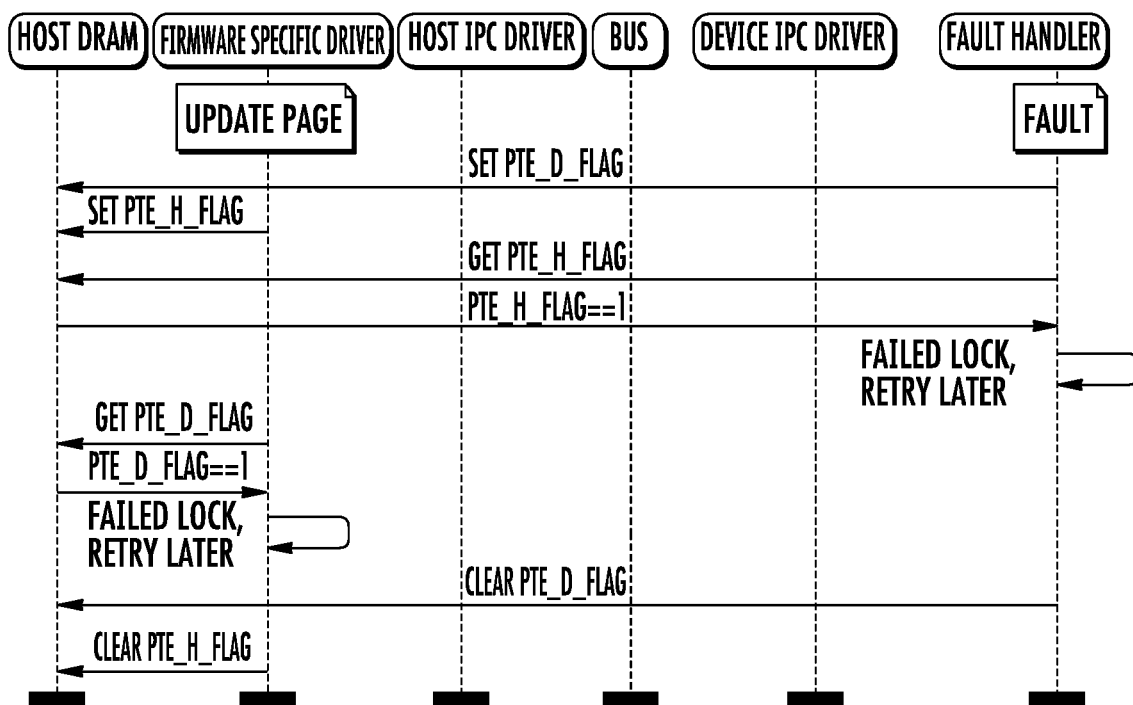

FIG. 5E illustrates the worst case logical sequence diagram where the host device and peripheral device attempt to acquire the page table entry (PTE) lock nearly simultaneously and where both processors check the other processor's semaphore flag before the other processor has had the chance to clear the flag. As shown, the peripheral device attempts to set the PTE_D_flag slightly before the host device attempts to set the PTE_H_flag. In this scenario the peripheral device checks PTE_H_flag before the host has cleared its flag. Responsively, the peripheral device concludes that it failed to acquire the lock. Similarly, the host checks the PTE_D_flag before the peripheral has cleared its flag, thereby concluded that it has also failed to lock. Thereafter, both processors clear their flags. In this case, both host and peripheral fail to acquire lock.

Figure 6:
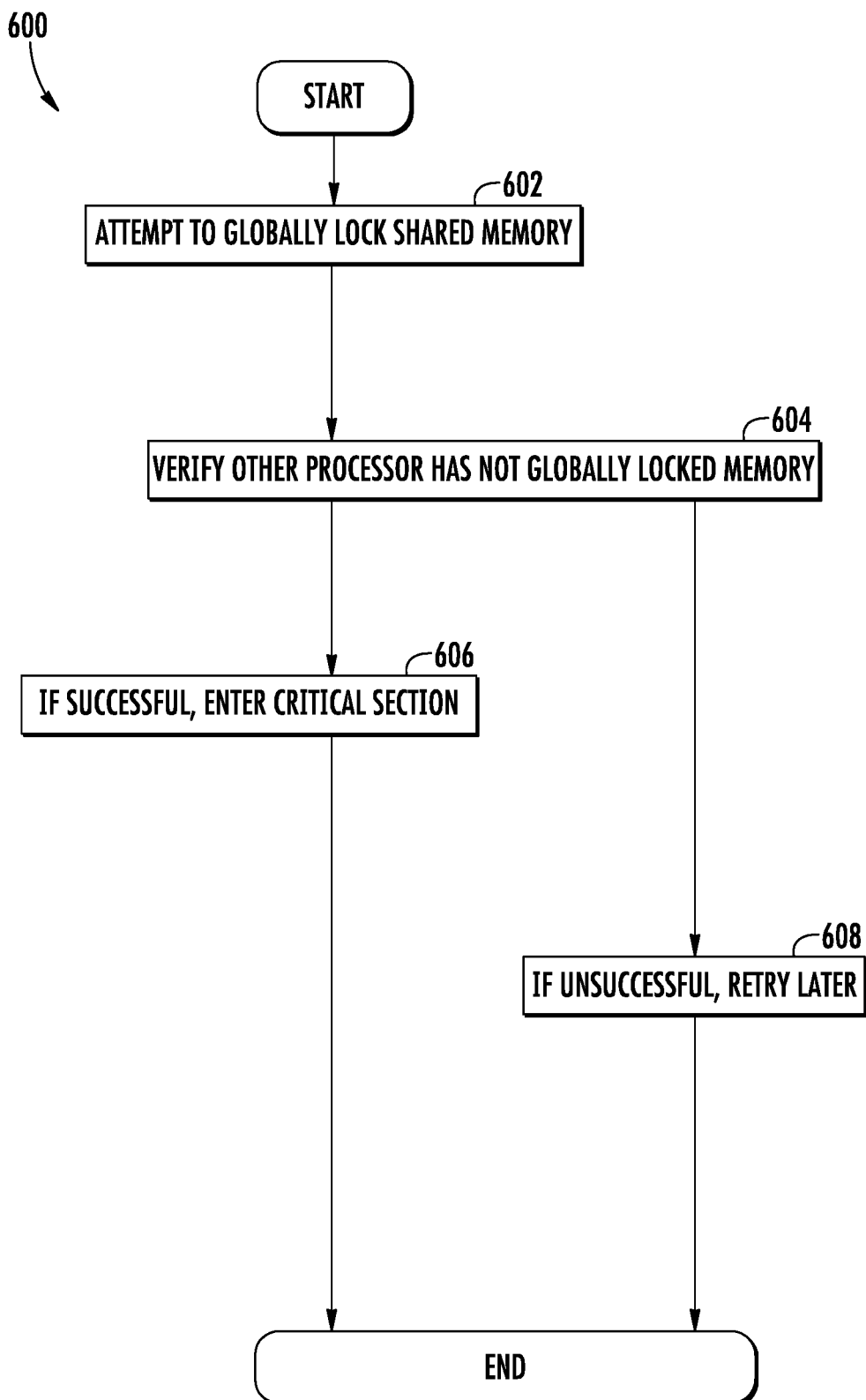
FIG. 6 is a logical flow diagram illustrating one generalized scheme for globally locking a shared memory, in accordance with the present disclosure.

FIG. 6 is a logical flow diagram illustrating one generalized scheme for globally locking a shared memory.

At step 602 of the method 600, the processor sets a semaphore flag indicating that it is attempting to globally lock the shared memory. In one exemplary embodiment, the host and peripheral device contend for access to the firmware specific shared memory using a corresponding set of flag registers. The peripheral device has a semaphore register GLK_D_flag which when asserted indicates that the peripheral device has successfully gained control of the shared memory; the host will refrain from accessing the shared memory until the GLK_D_flag has been de-asserted. Similarly the host device has a counterpart semaphore register GLK_H_flag that indicates when the host has control.

In some embodiments, the semaphore register is also a read and writeable register that both processors can access. In other embodiments, the semaphore mechanism may be a writeable address for one processor, and readable by the other processor (but not vice versa). For example, the semaphore mechanism may be directly coupled to dedicated interrupts within the other processor, etc.

In some embodiments, the semaphore flag is stored within a dedicated register, or other memory mapped data structure. Other common mechanisms for signaling may be used with equal success; for example, in some cases, the semaphore may embodied as a message, packet, dedicated signaling lines, etc.

At step 604 of the method 600, the processor checks to verify that the other processor has not also attempted to globally lock the shared memory. In some embodiments, the checking is performed by reading another other processor's semaphore flag. In other embodiments, verification may be provided via separate messaging e.g., an acknowledgement packet or signal. In some embodiments, the processor can infer that the other processor has not also attempted to lock the paging table entry, if its attempted lock was successful.

At step 606 of the method 600, if the other processor's flag is not present, then the processor has successfully globally locked the shared memory and can enter its critical section. Unlike the aforementioned paging table lock, the global lock is directed to lower priority activities (e.g., updating tracking information). For example, the global lock allows the peripheral processor to write all of the changes to tracking information.

At step 608 of the method 500, if the other processor's flag is present, then the processor has unsuccessfully performed a global lock. In some embodiments, the processor will idle (or sleep) before re-attempting to lock the paging table entry. In other embodiments, the processor will divert its energies to other tasks before re-attempting to lock. For certain non-critical functions, the processor may simply abandon the access attempt. In one such exemplary variant, the global lock is implemented as a retry-later-lock.

The following detailed examples are illustrative examples of the principles described in the foregoing generalized discussion of the generalized scheme for globally locking a shared memory.

Figure 6A:
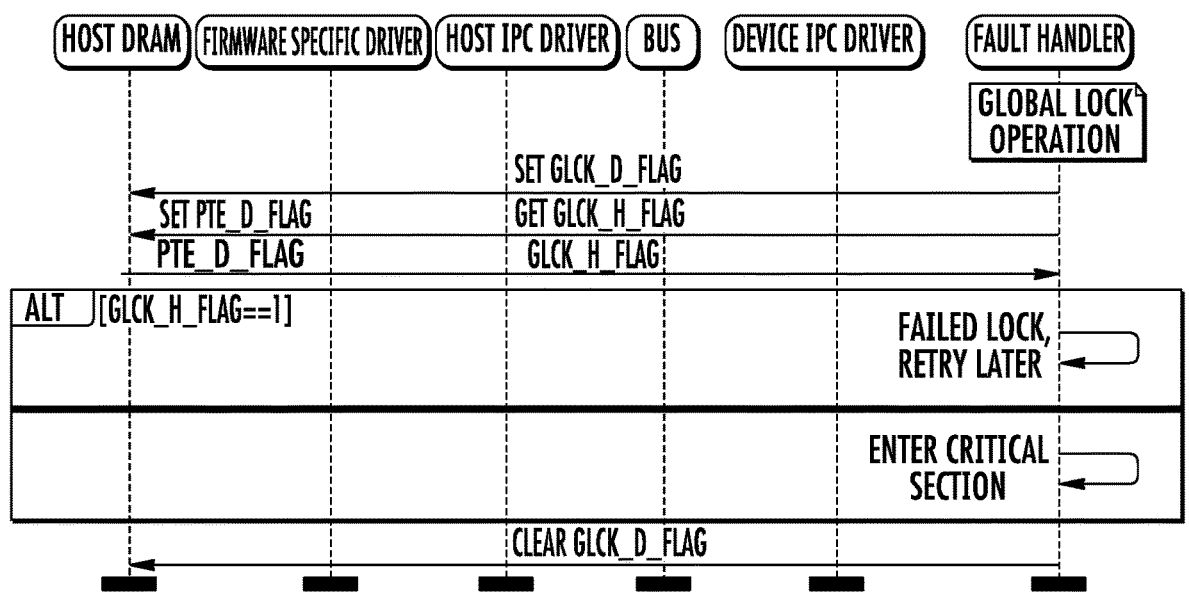
FIGS. 6A-6G are logical flow diagrams illustrating various contention scenarios illustrative of the generalized method of FIG. 6.

FIG. 6A illustrates one exemplary logical sequence diagram useful for describing the scenario where the peripheral device attempts to acquire the global lock. As shown, the peripheral device acquires the global lock by setting a GLCK_D_flag. Thereafter, the peripheral device verifies that the host is not also globally locking the shared memory by reading the GLCK_H_flag. Upon successful verification, the peripheral enters its critical section and after completion, releases the lock.

Figure 6B:
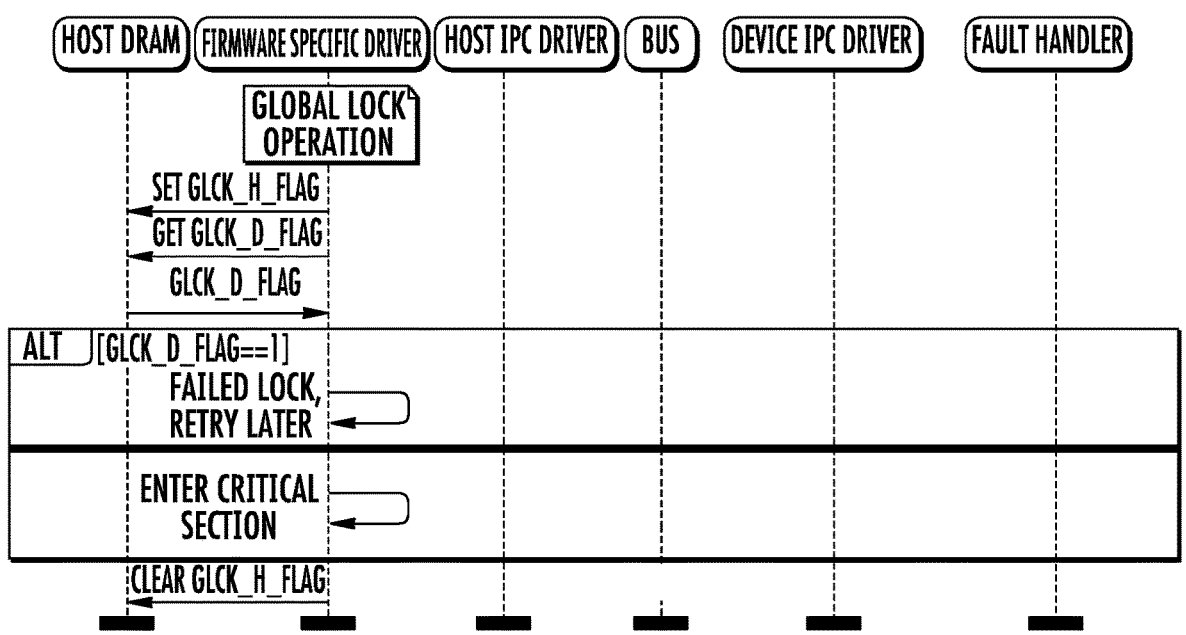

FIG. 6B illustrates one exemplary logical sequence diagram useful for describing the scenario where the host device attempts to acquire the global lock. As shown, the host device acquires the global lock by setting a GLCK_H_flag. Thereafter, the host device verifies that the peripheral is not also globally locking the shared memory by reading the GLCK_D_flag. Upon successful verification, the peripheral enters its critical section and after completion, releases the lock.

Figure 6C:
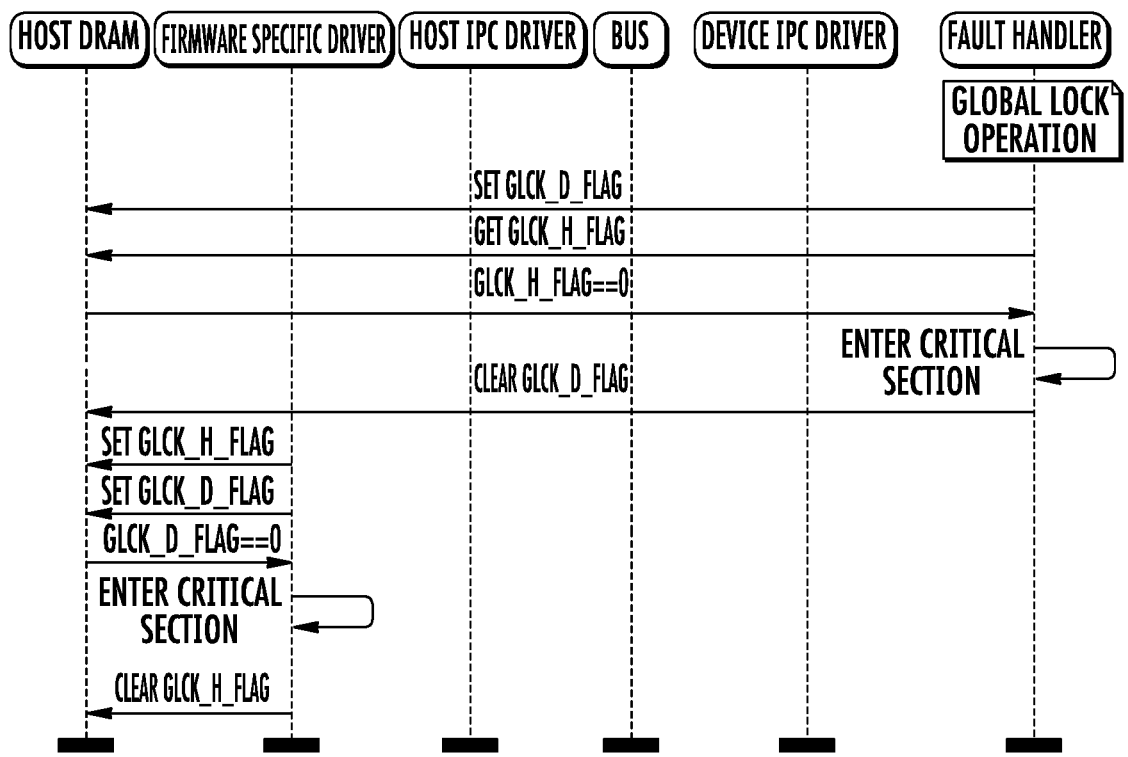
Figure 6D:
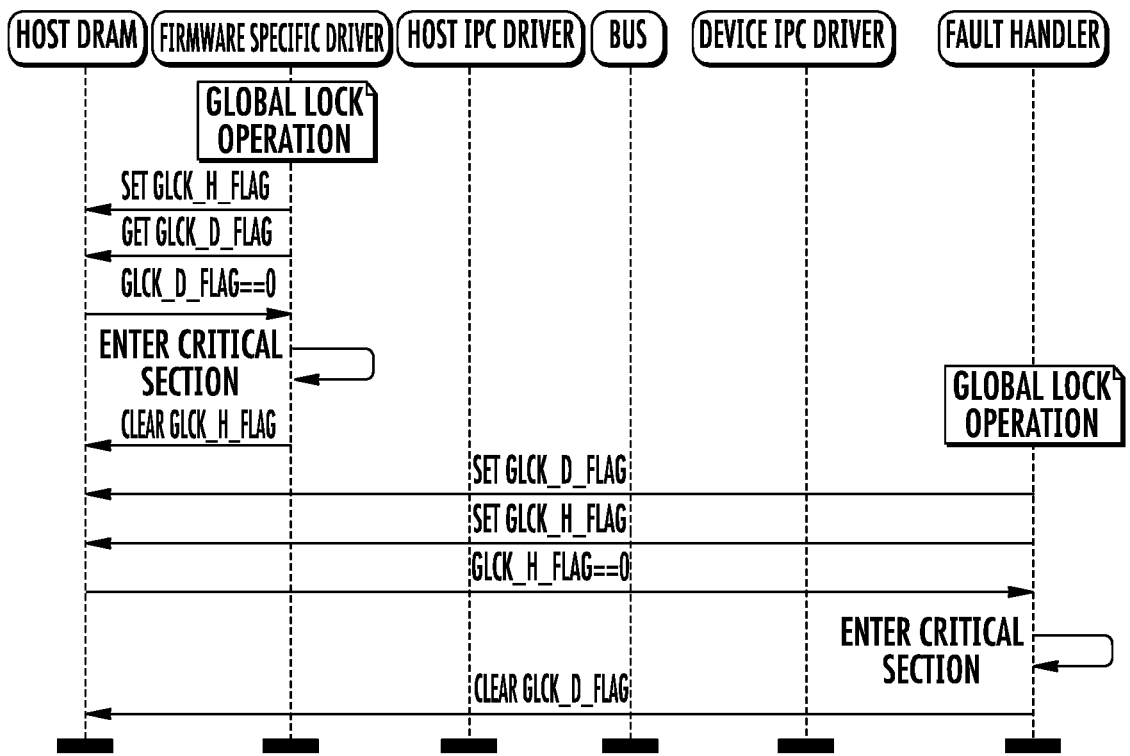

FIGS. 6C and 6D illustrate exemplary logical sequence diagram useful for describing the scenario where the host and peripheral devices attempt to acquire the global lock, and where contention is not an issue (i.e., where the global lock operations do not overlap).

Figure 6E:
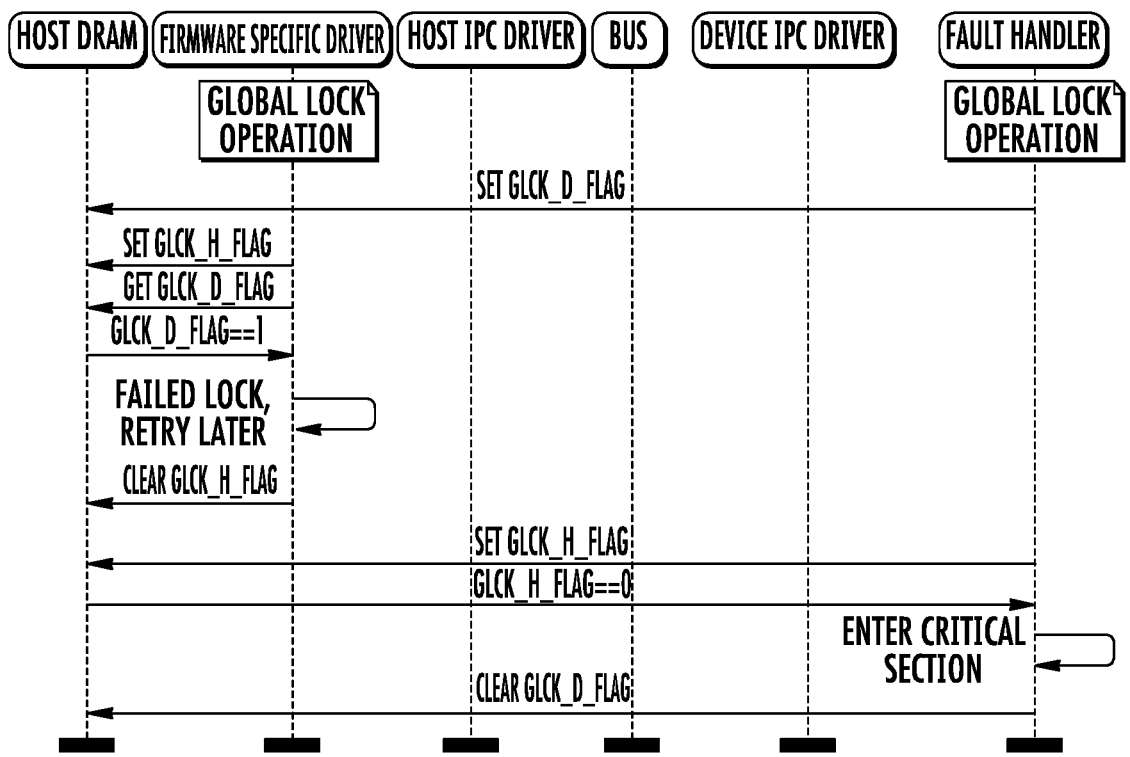

FIG. 6E illustrates a first exemplary logical sequence diagram useful for describing the scenario where the host device and peripheral device attempt to acquire the global lock nearly simultaneously. As shown, the peripheral device attempts to set the GLCK_D_flag slightly before the host device attempts to set the GLCK_H_flag. Since the host sees that the GLCK_D_flag is set, the host concludes that it failed to acquire the lock, and responsively it clears the GLCK_H_flag. Thereafter, when the device verifies that the GLCK_H_flag isn't set, the device has successfully acquired the lock and can enter the critical section. When the peripheral processor is done, it clears the GLCK_D_flag to release the lock.

Figure 6F:
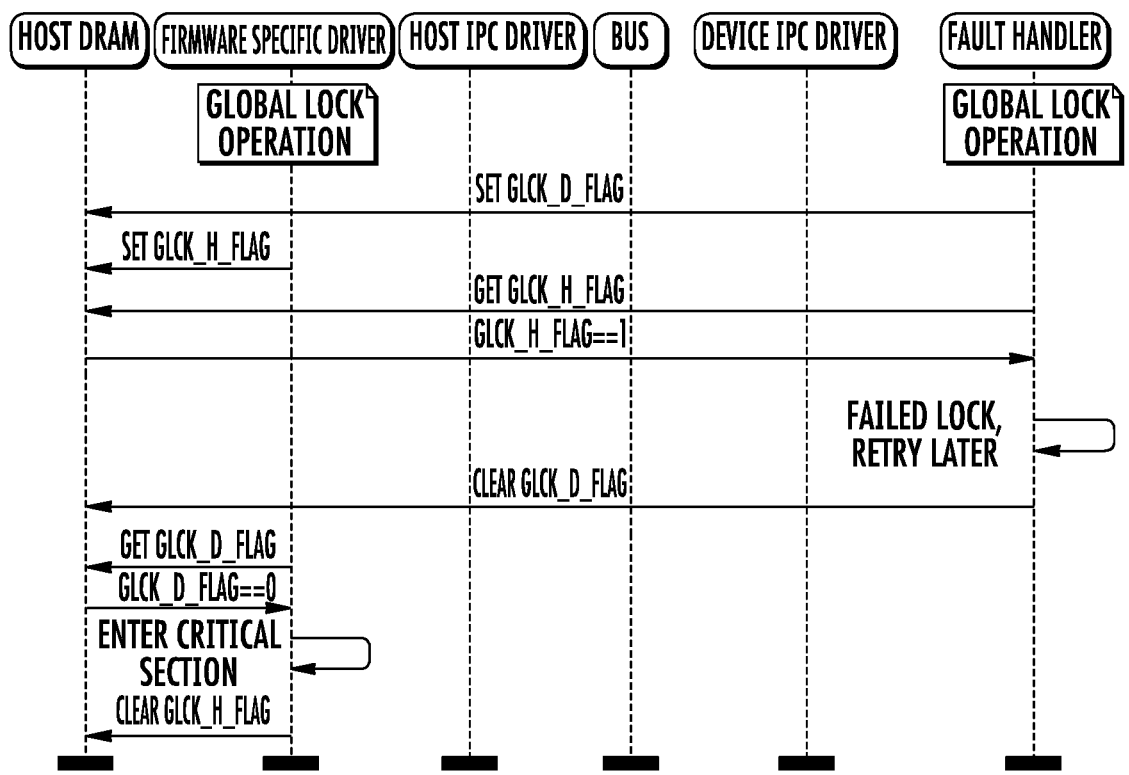

FIG. 6F illustrates a second exemplary logical sequence diagram useful for describing the scenario where the host device and peripheral device attempt to acquire the global lock nearly simultaneously. As shown, the peripheral device attempts to set the GLCK_D_flag slightly before the host device attempts to set the GLCK_H_flag, however under this scenario the peripheral checks GLCK_H_flag first, and concludes that it failed to acquire the lock. The peripheral device clears the GLCK_D_flag. Thereafter, when the host verifies that the GLCK_D_flag isn't set, the host concludes that it has successfully acquired the lock and can enter the critical section. When the host processor is done, it clears the GLCK_H_flag to release the lock.

Figure 6G:
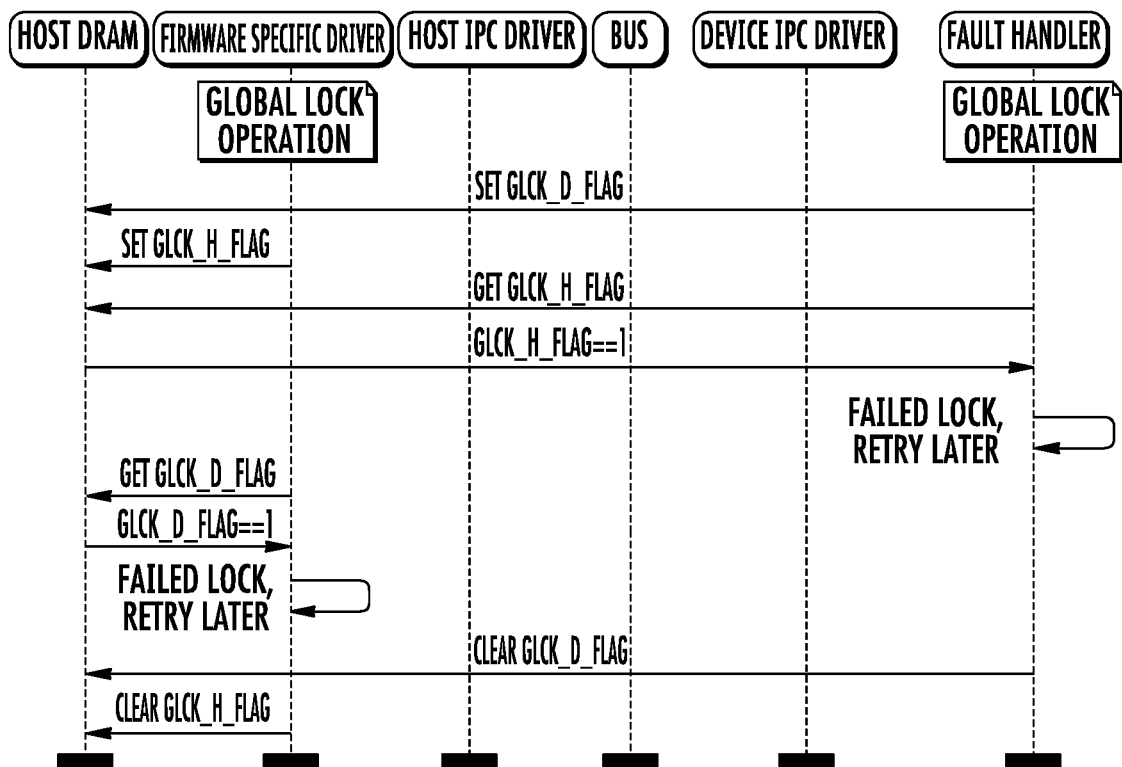

FIG. 6G illustrates the worst case logical sequence diagram where the host device and peripheral device attempt to acquire the global lock nearly simultaneously and where both processors check the other processor's semaphore flag before the other processor has had the chance to clear the flag. As shown, the peripheral device attempts to set the GLCK_D_flag slightly before the host device attempts to set the GLCK_H_flag. In this scenario the peripheral device checks GLCK_H_flag before the host has cleared its flag. Responsively, the peripheral device concludes that it failed to acquire the lock. Similarly, the host checks the GLCK_D_flag before the peripheral has cleared its flag, thereby concluded that it has also failed to lock. Thereafter, both processors clear their flags. In this case, both host and peripheral fail to acquire lock and must retry at a later time.

Figure 7:
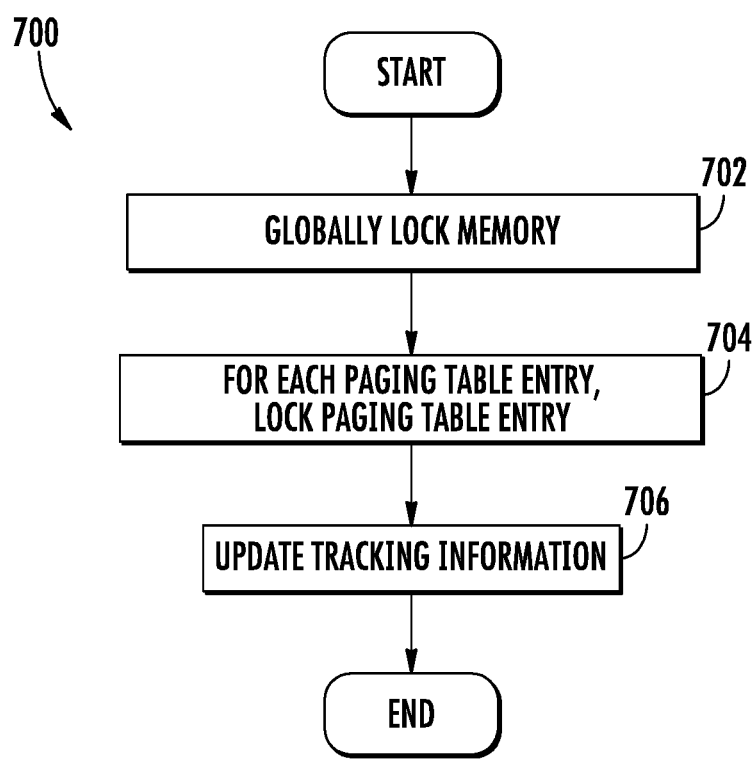
FIG. 7 is a logical flow diagram illustrating one generalized scheme for modifying tracking information by the host processor, in accordance with the present disclosure.

FIG. 7 is a logical flow diagram illustrating one generalized scheme for modifying tracking information by the host processor. In one exemplary embodiment, the tracking information (e.g., LRU field) is part of the same byte in the page table entry as the semaphore (e.g., PTE_D_flag). Consequently, the host cannot change the tracking information without also overwriting the peripheral's lock. This highly undesirable access hazard can be avoided by ensuring that the host only modifies the tracking information when the peripheral is not asserting the semaphore. More directly, in order to ensure that the host does not overwrite the PTE_D_flag, the host should only update the LRU field when the device does not have access (i.e., when the PTE_D_flag is zero (0)). Additionally, since the aforementioned global lock affects all paging tables other than the paging table entry held under PTE lock, the host must hold both the global lock and the PTE lock of the corresponding page table entry to modify the LRU field. The host device is not susceptible to the same hazard, thus the peripheral processor can update the LRU field of any page table entry as long as it holds the global lock.

At step 702 of the method 700, the host processor attempts to globally lock the shared memory, in accordance with the generalized method described in FIG. 6 supra.

At step 704 of the method 700, for each paging table entry of the shared memory that must be modified, the host processor must additionally attempt to obtain the paging table entry lock, in accordance with the generalized method described in FIG. 5 supra.

At step 706 of the method 700, if the host processor has successfully obtained both the global and paging table entry locks, then the host processor can update the tracking information for the paging table entry.

The following detailed examples are illustrative examples of the principles described in the foregoing generalized discussion of the generalized scheme for modifying tracking information by the host processor.

Figure 7A:
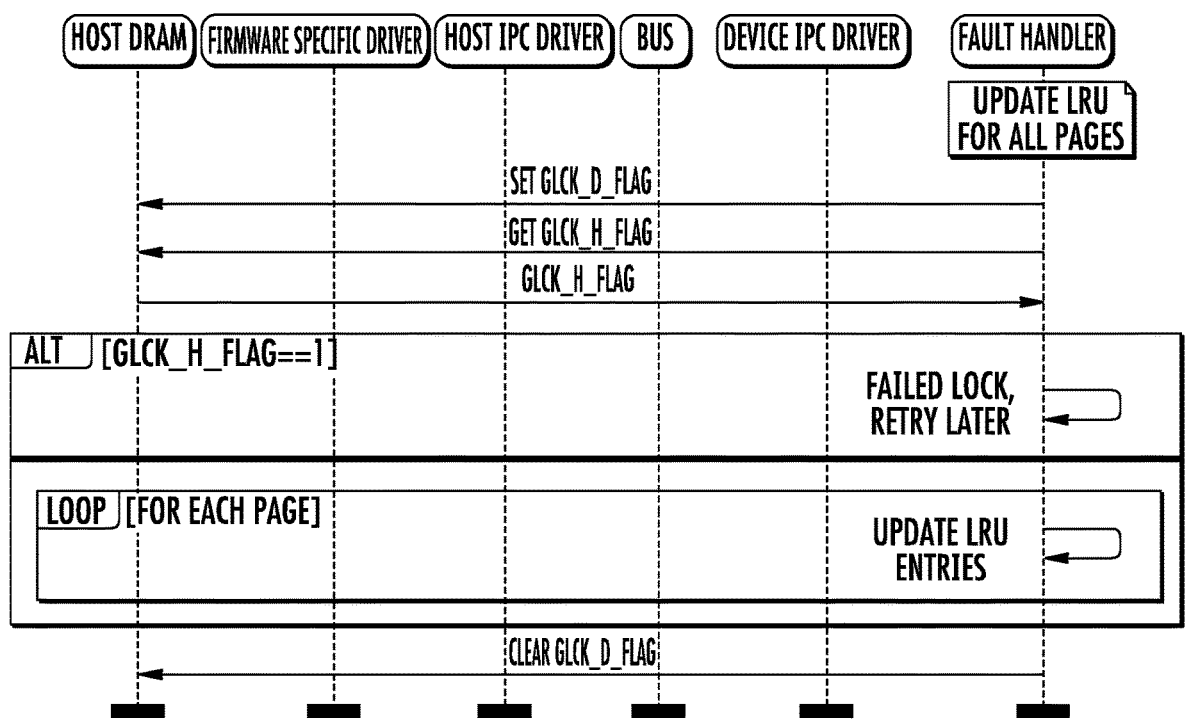
FIGS. 7A-7G are logical flow diagrams illustrating various contention scenarios illustrative of the generalized method of FIG. 7.

FIG. 7A illustrates one exemplary logical sequence diagram useful for describing the scenario where the peripheral device attempts to update the LRU field of a page table entry. As shown, the peripheral device first tries to acquire the global lock. If it fails, it must try again later; however, if it succeeds in acquiring the global lock, then it can update the appropriate LRU entries for all the pages that the peripheral device has updates for. After it is done, it releases the global lock.

Figure 7B:
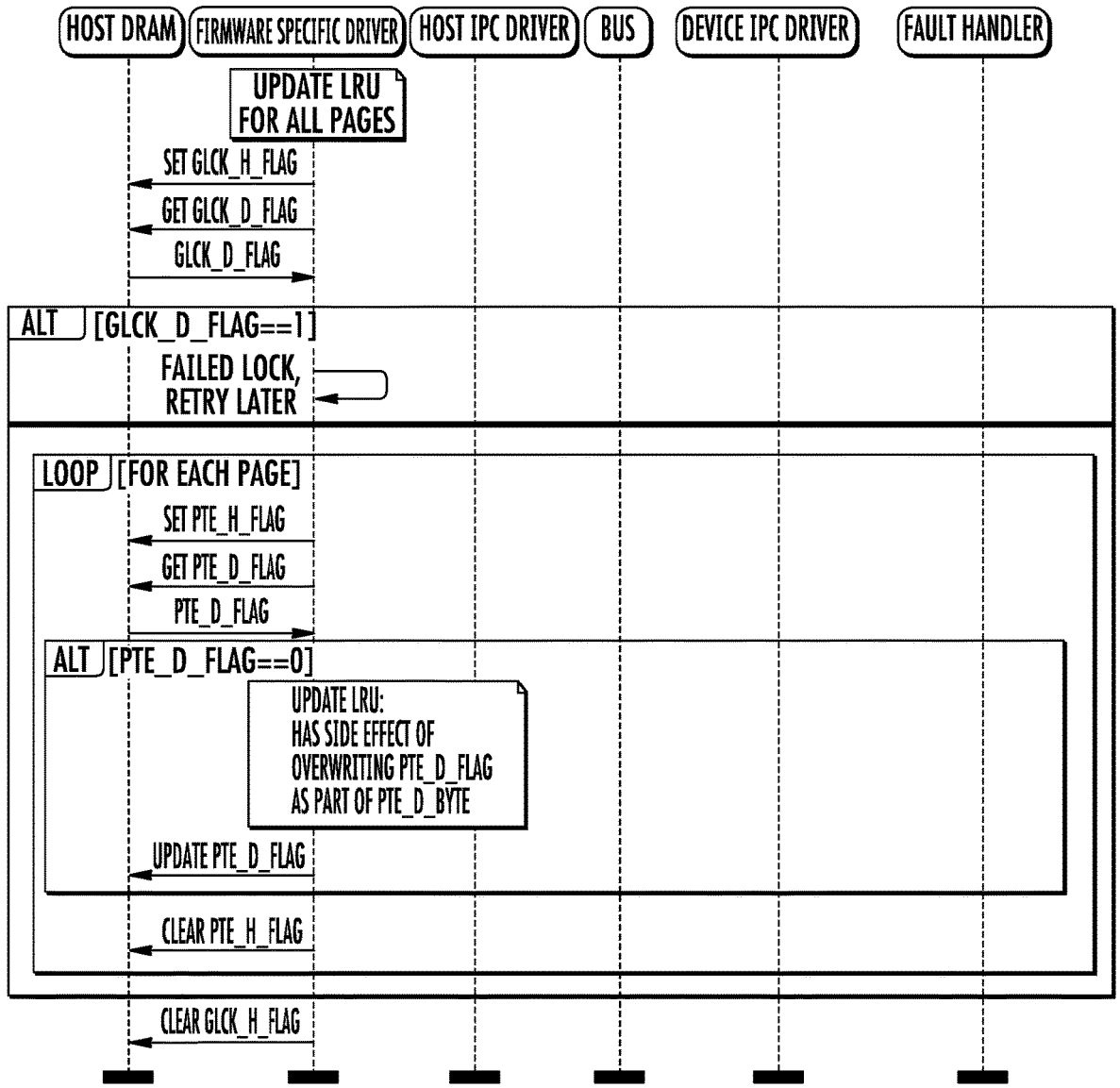

FIG. 7B illustrates one exemplary logical sequence diagram useful for describing the scenario where the host attempts to update the LRU field of one or more paging table entries (e.g., for reset, etc). As shown, the host first tries to acquire the global lock. If it fails, it must try again later; however, if it succeeds in acquiring the global lock, then it must also attempt to acquire the PTE lock for each page to be updated. Once the host has acquired the PTE lock, then it can update the appropriate LRU of that page. This process is iterated for each page that the host updates. Once the host has completed its updates, it releases the global lock.

Figure 7C:
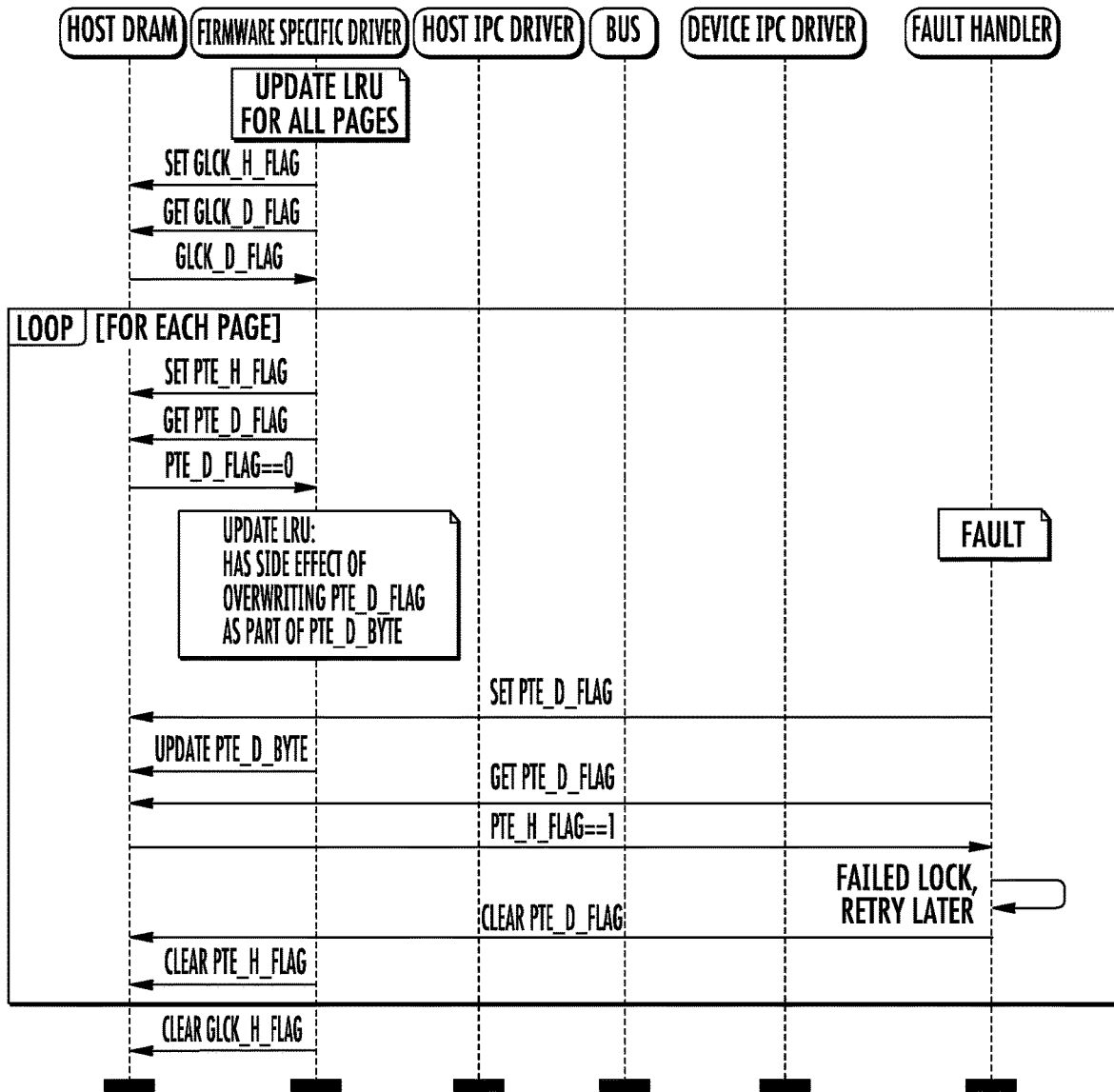

FIG. 7C illustrates a first logical sequence diagram useful for describing the scenario where the peripheral device encounters a fault while the host is updating the various LRU bits of page table entries. Under these circumstances, the peripheral device attempts to lock the PTE by setting the PTE_D_flag; however, upon reading the PTE_H_flag, the peripheral determines that it has failed the PTE lock, and must retry later. The peripheral clears PTE_D_flag, and must wait until the host has released both PTE_H_flag and GLCK_H_flag.

Figure 7D:
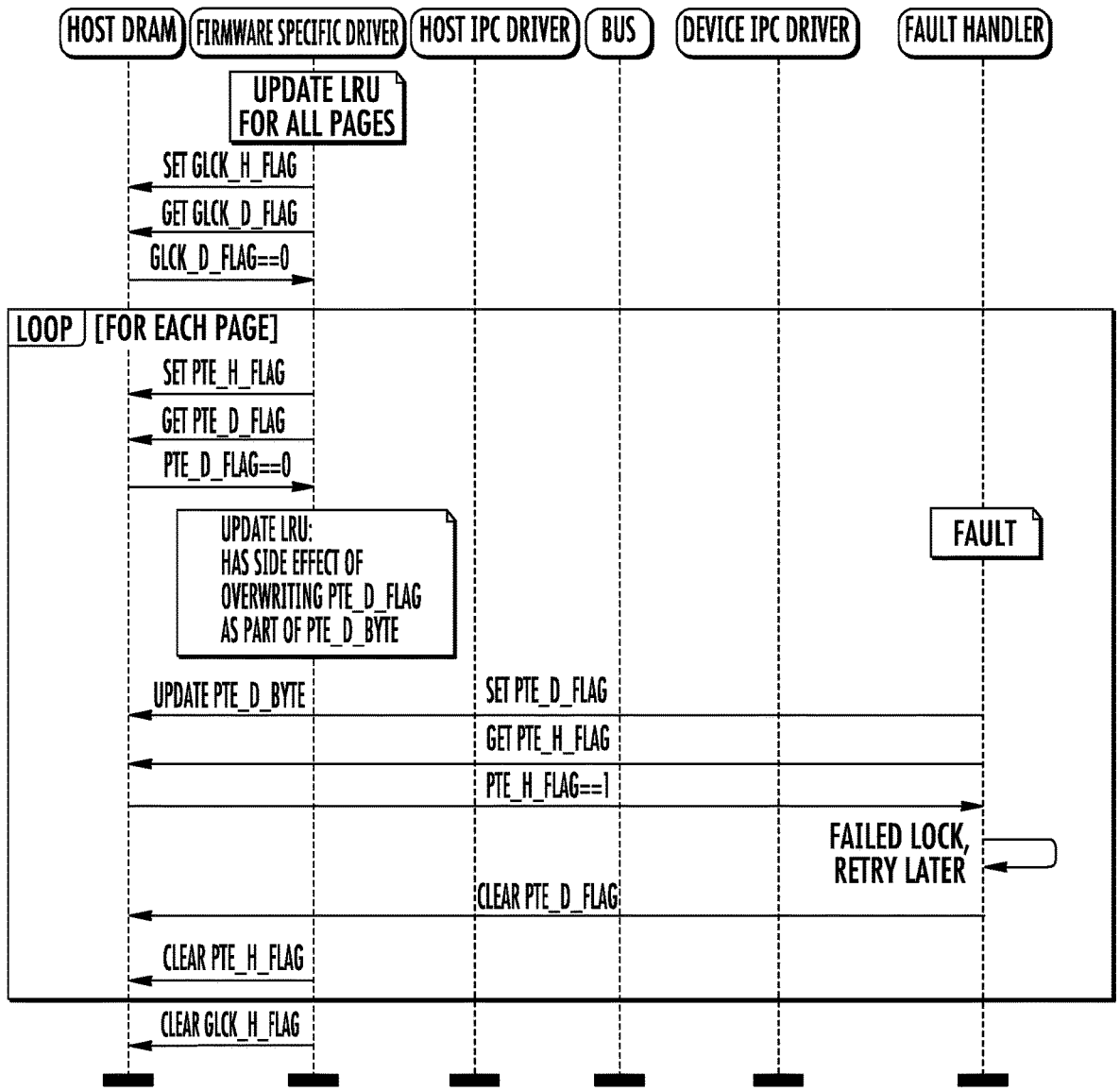

FIG. 7D illustrates a second logical sequence diagram useful for describing the scenario where the peripheral device encounters a fault while the host is updating the various LRU bits of page table entries. Unlike FIG. 7C, in this case the host completes the update of the paging table entry of interest; thus, the PTE_H_flag is de-asserted and the peripheral can establish control by asserting PTE_D_flag. Thereafter, the peripheral can enter its critical section. Once the peripheral has completed its critical section, the peripheral de-asserts the PTE_D_flag.

Figure 7E:
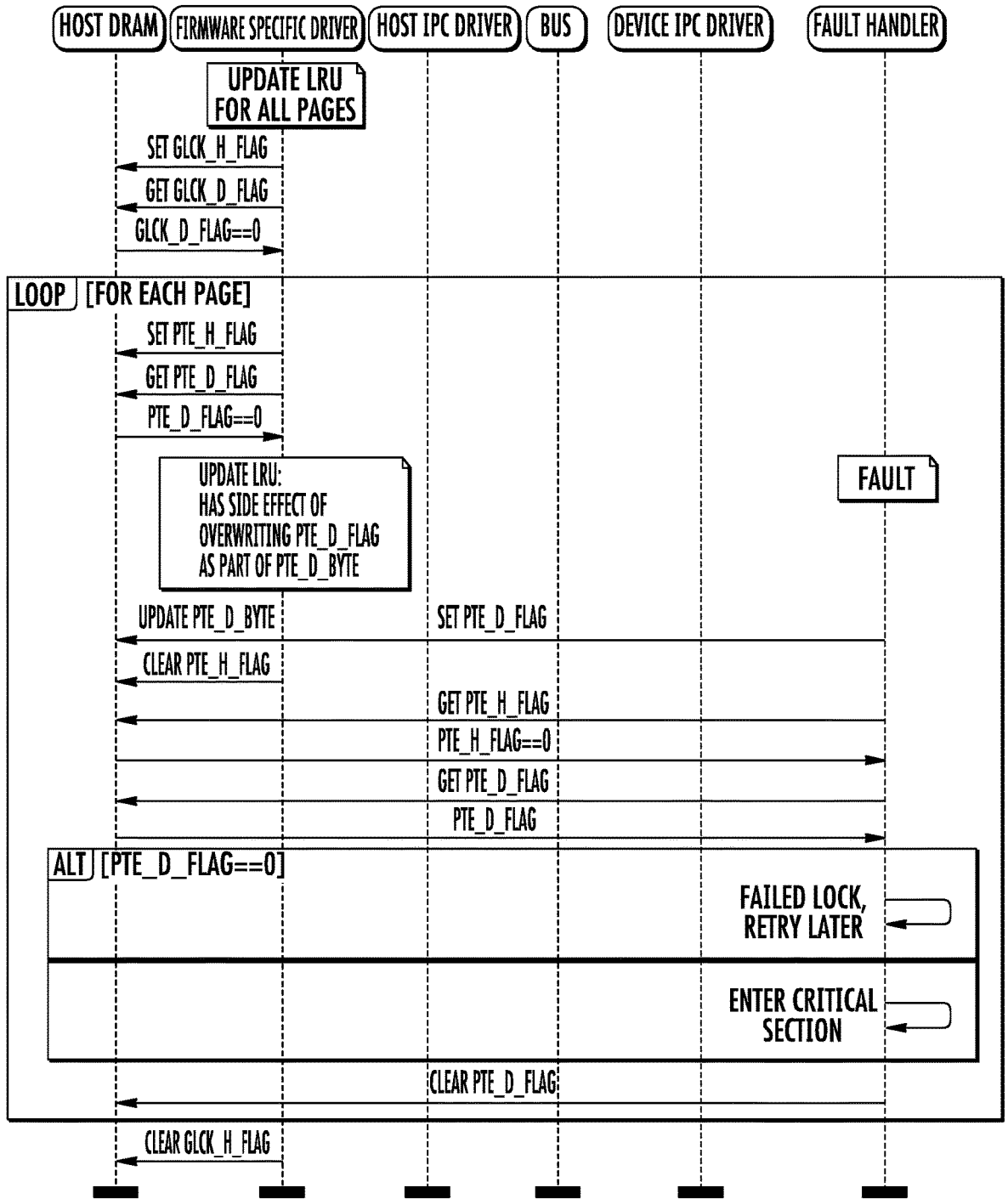

FIG. 7E illustrates a third logical sequence diagram useful for describing the scenario where the peripheral device encounters a fault while the host is updating the various LRU bits of page table entries. In this case the host completes the update of the paging table entry of interest but has not cleared PTE_H_flag. At that time, the peripheral device faults and attempts to access the paging table entry held by PTE_H_flag. Since PTE_H_flag is set, the peripheral fails to lock and must wait until the host releases PTE_H_flag before retrying.

Figure 7F:
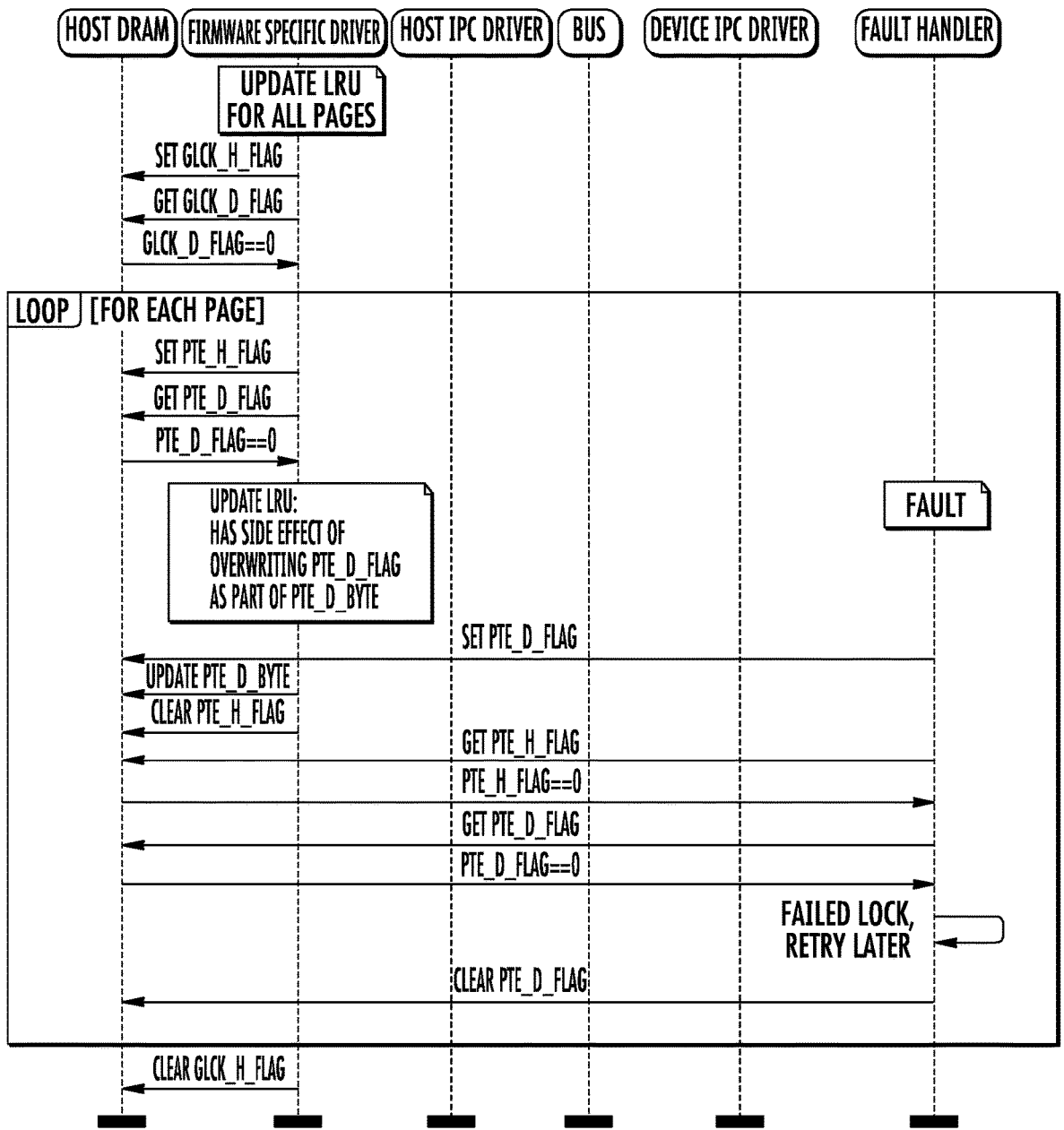
Figure 7G:
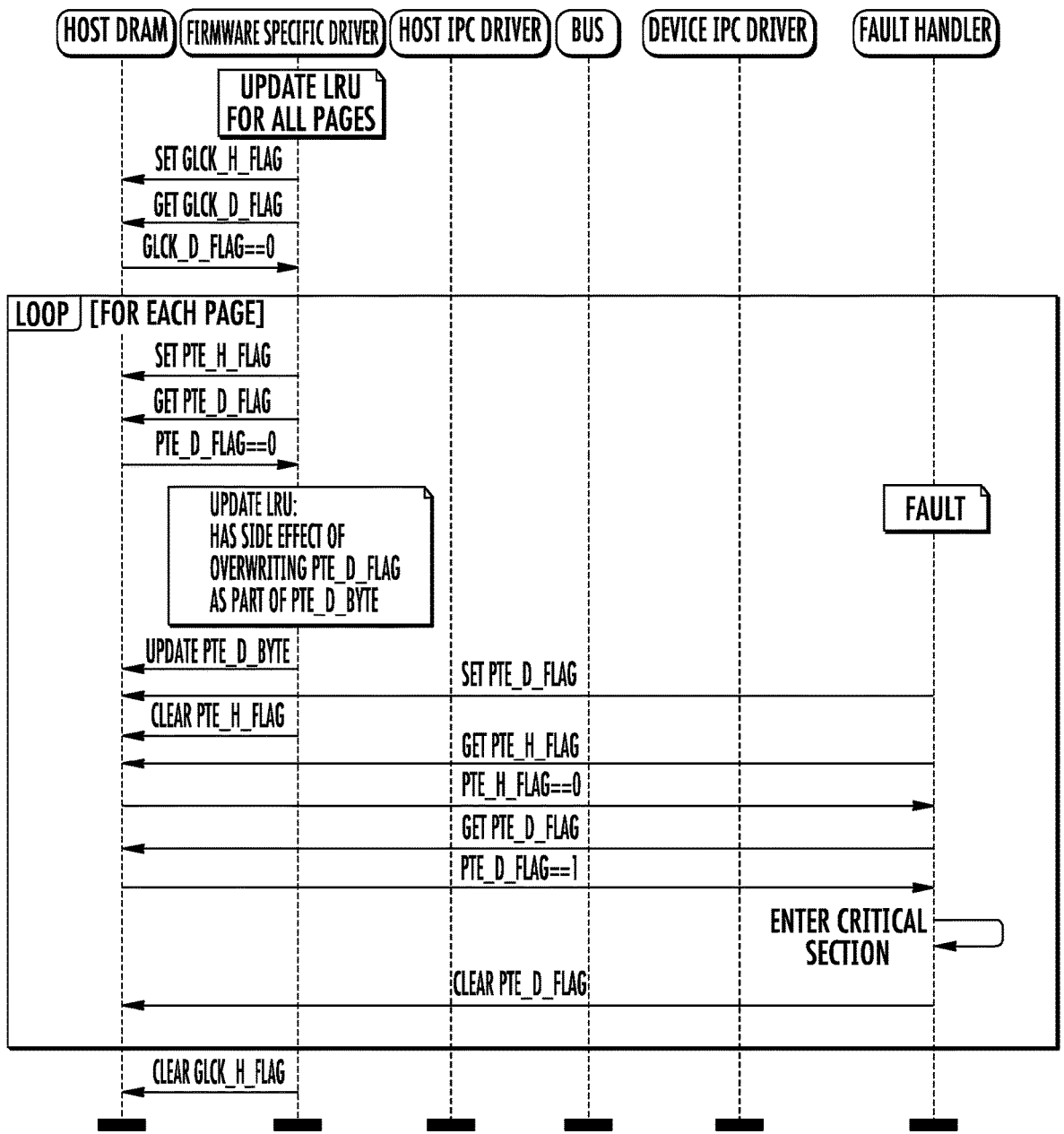

FIGS. 7F and 7G illustrates a fourth and fifth logical sequence diagram useful for describing the scenario where the peripheral device encounters a fault while the host is updating the various LRU bits of page table entries. In this case the host updates the exact paging table entry (PTE_D_byte) at the very same time that the peripheral writes it to set the PTE_D_flag. FIG. 7F illustrates the consequences when the peripheral device fails the race condition (i.e., PTE_D_flag is de-asserted) and must retry later. FIG. 7G illustrates the consequences when the peripheral device wins the race condition (i.e., PTE_D_flag is asserted) and is allowed to enter its critical section.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for initializing firmware for execution on a device processor with limited access to memory, comprising:

subsequent to performing an initialization function necessary for initial operation of the device processor, attempting to execute a portion of a firmware image retrieved by the device processor from a shared memory accessible by a host processor and the device processor;

generating a page fault by the device processor when a memory access for the firmware image is outside of a resident memory range, the page fault configured to cause the host processor to service the page fault;

in response to the generating of the page fault by the device processor, requesting one or more supplemental modules of the firmware image from the shared memory to be loaded on demand during runtime of the device processor, the requesting of the one or more supplemental modules enabling performance of one or more requested functions that are not currently resident on a memory associated with the device processor, the one or more requested functions being distinct from the performed initialization function; and resuming execution of the portion of the firmware image by the device processor.

2. The method of claim 1, further comprising idling the device processor while the host processor services the page fault.

3. The method of claim 1, further comprising executing an unrelated process while the host processor services the page fault.

4. The method of claim 1, further comprising storing the firmware image in a plurality of pages of memory;

identifying a frequency of use for respective pages in the plurality of pages of memory; and prioritizing the respective pages based on the identified frequency of use.

5. The method of claim 4, further comprising evicting one or more pages of the plurality of pages from a processor primary memory location, the evicting being based at least in part on the prioritizing.

6. The method of claim 1, further comprising receiving a notification for one or more modules of the firmware image, the notification indicating that the one or more modules are likely to be needed by the device processor.

7. The method of claim 1, further comprising receiving an on-demand firmware module in response to the generated page fault, the one or more supplemental modules of the firmware image comprising the on-demand firmware module.

8. An electronic device configured to initialize firmware for execution on a processor with limited access to memory, comprising:

a host processor;

a peripheral processor;

a physical bus interface configured to couple the host processor to the peripheral processor; and a software framework configured to be executed by the host processor and the peripheral processor, the software framework comprising logic configured to:

attempt to execute a portion of a firmware image located within a primary memory of the peripheral processor;

generate a page fault when a memory access for the firmware image is outside of a resident memory range located within the primary memory of the peripheral processor, the page fault configured to cause the host processor to service the page fault;

service the page fault by the host processor, the service of the page fault comprising a check of whether a requested page of a plurality of pages of a shared memory accessible by the host processor and the peripheral processor is locked for access based on a locking mechanism configured to selectively lock access by either the host processor or the peripheral processor, the service of the page fault further comprising retrieval of a requested firmware function contained in the requested page of the plurality of pages of the shared memory; and resume execution of the portion of the firmware image by the peripheral processor.

9. The electronic device of claim 8, wherein the host processor is configured to trigger an advanced firmware fetching operation for the peripheral processor.

10. The electronic device of claim 8, wherein the portion of the firmware image located within the primary memory of the peripheral processor further comprises a link to a page of memory located in a memory location external to the peripheral processor.

11. The electronic device of claim 8, wherein the peripheral processor is configured to be idled while the page fault is serviced by the host processor.

12. The electronic device of claim 8, wherein the software framework for the service of the page fault further comprises logic configured to:

retrieve, by the host processor, a second portion of the firmware image associated with the page fault from a secondary memory; and transmit the second portion of the firmware image associated with the page fault across the physical bus interface to the peripheral processor.

13. The electronic device of claim 12, wherein the software framework for the service of the page fault further comprises logic configured to:

determine, by the host processor, where the second portion of the firmware image associated with the page fault is stored in the secondary memory.

14. A peripheral processing device, comprising:

a processing unit in communication with a host processing unit;

an execution memory in signal communication with the processing unit; and a physical bus interface in communication with the processing unit, the physical bus interface coupled to a communications link;

wherein the peripheral processing device is further configured to:

attempt to execute a portion of a firmware image located within the execution memory;

generate a page fault when a memory access for the firmware image is outside of a memory range associated with the execution memory;

service the page fault, the service of the page fault comprising (i) identification, based on a determination from the host processing unit, of a location of shared memory storing a requested page associated with the portion of the firmware image, (ii) arbitration, with the host processing unit, for direct access to the location of shared memory, and (iii) retrieval of the portion of the firmware image from the location of shared memory; and resume execution of the firmware image.

15. The peripheral processing device of claim 14, wherein the host processing unit is configured to enter an idle state while the peripheral processing device services the page fault.

16. The peripheral processing device of claim 14, wherein the peripheral processing device is further configured to execute an unrelated process that does not depend on the portion of the firmware image, the execution of the unrelated process occurring during the service of the page fault.

17. The peripheral processing device of claim 14, wherein the peripheral processing device is further configured receive an advanced firmware fetching operation via the physical bus interface.

18. The peripheral processing device of claim 14, wherein the portion of the firmware image located within the execution memory of the peripheral processing device further comprises a link to a page of memory located in a memory location external to the peripheral processing device.

19. The peripheral processing device of claim 14, wherein the peripheral processing device is further configured to:
receive, via the physical bus interface, a second portion of the firmware image associated with the page fault from a secondary memory, the secondary memory located external to the peripheral processing device.

20. The peripheral processing device of claim 19, wherein the peripheral processing device is further configured evict one or more portions of the firmware image from the execution memory of the peripheral processing device.

21. The peripheral processing device of claim 14, wherein the identified location of memory storing the portion of the firmware image comprises at least one of: (i) a first location associated with the execution memory, and (ii) a second location associated with at least another shared memory, the first and second locations being determined by the host processing unit.

* * * * *